US010513154B2

(12) United States Patent
Munezawa et al.

(10) Patent No.: US 10,513,154 B2
(45) Date of Patent: Dec. 24, 2019

(54) PNEUMATIC TIRE WITH SPECIFIED BEAD PORTIONS

(71) Applicant: SUMITOMO RUBBER INDUSTRIES, LTD., Kobe-shi, Hyogo (JP)

(72) Inventors: Goro Munezawa, Kobe (JP); Sho Takada, Kobe (JP); Masanori Mitsuoka, Kobe (JP); Takanori Kogiso, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 366 days.

(21) Appl. No.: 15/118,640

(22) PCT Filed: Feb. 23, 2015

(86) PCT No.: PCT/JP2015/054925
§ 371 (c)(1),
(2) Date: Aug. 12, 2016

(87) PCT Pub. No.: WO2015/129595
PCT Pub. Date: Sep. 3, 2015

(65) Prior Publication Data
US 2017/0072750 A1 Mar. 16, 2017

(30) Foreign Application Priority Data

Feb. 26, 2014 (JP) .................. 2014-036015
Aug. 6, 2014 (JP) .................. 2014-160038
Sep. 29, 2014 (JP) .................. 2014-197936

(51) Int. Cl.
B60C 15/06 (2006.01)
B60C 15/00 (2006.01)

(52) U.S. Cl.
CPC ...... B60C 15/0603 (2013.01); B60C 15/0054 (2013.01); B60C 15/0607 (2013.01);
(Continued)

(58) Field of Classification Search
CPC ............ B60C 15/0054; B60C 15/0603; B60C 15/0607; B60C 15/06; B60C 15/0009;
(Continued)

(56) References Cited

U.S. PATENT DOCUMENTS 9,931,895 B2 * 4/2018 Munezawa ......... B60C 15/0603
2001/0054467 A1 12/2001 Auxerre
(Continued)

FOREIGN PATENT DOCUMENTS

EP    1 321 313 A2 *  6/2003
EP    1676729 A1      7/2006
(Continued)

OTHER PUBLICATIONS

Partial Supplementary European Search Report dated Sep. 29, 2017, for corresponding European Application No. 15755076.5.

Primary Examiner — Adrienne C. Johnstone
(74) Attorney, Agent, or Firm — Birch, Stewart, Kolasch & Birch, LLP

(57) ABSTRACT

A tire includes a pair of beads; a carcass that is extended on and between the beads on both sides; and a pair of strips that extend almost outward from the beads along the carcass in the radial direction. The beads include cores, first apexes, and second apexes. The carcass includes a carcass ply, and the carcass ply includes a main portion and turned-up portions. The turned-up portions are disposed between the first apexes and the second apexes. The turned-up portions contact with the main portion in portions radially outward of outer ends of the first apexes. A position of an outer end of each strip is equal, in the radial direction, to a position Pb at (Continued)

which the maximum width is obtained, or the outer end of each strip is disposed radially inward of the position Pb at which the maximum width is obtained.

6 Claims, 6 Drawing Sheets

(52) U.S. Cl.
CPC .. *B60C 2015/009* (2013.01); *B60C 2015/061* (2013.01); *B60C 2015/0614* (2013.01); *B60C 2015/0617* (2013.01); *B60C 2015/0621* (2013.01); *Y10T 152/10828* (2015.01); *Y10T 152/10837* (2015.01); *Y10T 152/10846* (2015.01); *Y10T 152/10864* (2015.01)

(58) Field of Classification Search
CPC .............. B60C 15/00; B60C 2015/061; B60C 2015/0621; B60C 2015/0617; B60C 2015/009; B60C 2015/0614; Y10T 152/10837; Y10T 152/10846; Y10T 152/10828
USPC ........ 152/541, 543, 546, 547, 552, 554, 555
See application file for complete search history.

(56) References Cited

U.S. PATENT DOCUMENTS

| | | | |
|---|---|---|---|
| 2012/0325390 A1* | 12/2012 | Bourgeois | B60C 15/0603 152/541 |
| 2013/0233461 A1 | 9/2013 | Mangia et al. | |

FOREIGN PATENT DOCUMENTS

| | | | |
|---|---|---|---|
| EP | 2905151 A1 | | 8/2015 |
| JP | 58110306 A | * | 6/1983 |
| JP | 2002-160510 A | | 6/2002 |
| JP | 2002-200904 A | | 7/2002 |
| JP | 2002200905 | * | 7/2002 |
| JP | 2003-512214 A | | 4/2003 |
| JP | 2004-182021 A | | 7/2004 |
| JP | 2005-255047 A | | 9/2005 |
| JP | 2006-188222 A | | 7/2006 |
| JP | 2007-45333 A | | 2/2007 |
| JP | 2007-45361 A | | 2/2007 |
| JP | 2012-25280 A | | 2/2012 |
| JP | 2012-218528 A | | 11/2012 |
| JP | 2014-54925 A | | 3/2014 |
| WO | WO 2012-053558 A1 | | 4/2012 |
| WO | WO 2014/019939 A1 | | 2/2014 |
| WO | WO-2015/186654 A1 | * | 12/2015 |

* cited by examiner

PNEUMATIC TIRE WITH SPECIFIED BEAD PORTIONS

TECHNICAL FIELD

The present invention relates to pneumatic tires. More specifically, the present invention relates to pneumatic tires for passenger cars.

BACKGROUND ART

A tire includes a pair of beads. A carcass is extended on and between the beads on both sides.

Each bead includes a core and an apex. The apex extends outward from the core in the radial direction. The apex is formed of a highly hard crosslinked rubber, and typically has a length of about 35 mm.

The carcass of the tire is formed by a carcass ply being turned up around the cores. Thus, the carcass ply includes: a main portion that extends from the equator plane toward each core; and turned-up portions each of which extends radially outward from the core along the apex.

In the tire, a bead portion is fitted into a rim. In a running state, the bead portion is under a heavy load. Therefore, durability in the bead portion is important. Various studies are made for the durability in the bead portion. An example of the study is disclosed in JP2005-255047.

As described above, in a running state, the bead portion is under a heavy load. Therefore, stiffness of the bead portion is important.

Various studies are made for arranging the structure of the bead portion and controlling stiffness of this portion. An example of the study is disclosed in JP2012-025280. In the tire disclosed therein, an apex (hereinafter, also referred to as a small apex) having a length less than a conventional apex is used for the bead. Further, another apex (hereinafter, also referred to as a support layer) is disposed axially outward of the turned-up portion of the carcass. In the tire, by the structure of the bead portion being thus arranged, durability is improved and weight is reduced.

CITATION LIST

Patent Literature

Patent Literature 1: JP2005-255047
Patent Literature 2: JP2012-025280

SUMMARY OF THE INVENTION

Problems to be Solved by the Invention

In general, a tire has clinches disposed axially outward of the beads. The clinches contact with flanges of a rim.

As described above, in a running state, the bead portion is under a heavy load. The turned-up portions are disposed between the clinches and the beads. Therefore, concentration of distortion on the turned-up portions is likely to occur. The concentration of the distortion may cause loosing. In order to prevent the loosing, for example, clinches having a large thickness are used, and high bending stiffness is imparted to the bead portion in some cases. However, steering stability of the tire is influenced by the tuning of the stiffness.

In the running state, deformation and restoration of the tire are repeated. This repetition may cause heat generation. The tire bead portion described above has a large volume. Therefore, an amount of heat generation in the bead portion is large. Further, heat is stored in the rubber. Heat exerts an influence upon durability of the tire.

Imparting a high bending stiffness to the bead portion exerts an influence upon vertical stiffness of the tire. The high vertical stiffness not only exerts an influence upon ride comfort but also causes increase of a noise in a frequency range from 80 Hz to 100 Hz. In the tire, quietness may be impaired.

An object of the present invention is to provide a pneumatic tire that has quietness and durability improved without reducing steering stability.

In order to improve fuel efficiency, tires are strongly required to have reduced weight. In the tire in which a small apex and a support layer are used as in the tire disclosed in JP2012-025280, the thickness of the bead portion can be reduced as compared to tires in which conventional apexes are used. Use of the small apex and the support layer contributes to reduction in weight of the tire. Meanwhile, this tire has a problem that, as compared to conventional tires, a lateral stiffness is insufficient and steering stability is not sufficient.

Another object of the present invention is to provide a pneumatic tire that has the weight reduced without reducing steering stability. Still another object of the present invention is to provide a pneumatic tire that has steering stability improved while inhibiting increase in mass.

Solution to the Problems

According to a first aspect, a pneumatic tire of the present invention includes: a tread having an outer surface that forms a tread surface; a pair of sidewalls that extend almost inward from ends, respectively, of the tread in a radial direction; a pair of clinches that extend almost inward from ends of the sidewalls, respectively, in the radial direction; a pair of beads disposed inward of the clinches, respectively, in an axial direction; a carcass extended on and between one of the beads and the other of the beads along inner sides of the tread and the sidewalls; and a pair of strips that extend almost outward from the beads, respectively, along the carcass in the radial direction. The beads include: cores; first apexes that extend outward from the cores in the radial direction; and second apexes disposed outward of the first apexes in the axial direction. The carcass includes a carcass ply. The carcass ply is turned up around the cores from an inner side toward an outer side in the axial direction, and the carcass ply includes a main portion and turned-up portions by the carcass ply being turned up. The turned-up portions are disposed between the first apexes and the second apexes. The turned-up portions contact with the main portion in portions radially outward of outer ends of the first apexes. Outer ends of the second apexes are disposed outward of ends of the turned-up portions in the radial direction. A position of an outer end of each strip is equal, in the radial direction, to a position at which the tire has a maximum width, or the outer end of each strip is disposed radially inward of the position at which the tire has the maximum width. A complex elastic modulus of each strip is higher than or equal to 60 MPa and not higher than 70 MPa.

According to a second aspect, another pneumatic tire of the present invention includes: a tread; a pair of sidewalls; a pair of beads; a carcass; and a pair of reinforcing layers. The sidewalls extend almost inward from ends, respectively, of the tread in a radial direction. The beads are disposed inward of the sidewalls, respectively, in the radial direction. The carcass is extended on and between one of the beads and the other of the beads along inner sides of the tread and the sidewalls. The reinforcing layers are disposed outward of the carcass in an axial direction. The beads include cores, and apexes that extend outward from the cores, respectively, in the radial direction. The reinforcing layers extend outward from portions near outer ends of the apexes along the carcass in the radial direction, and each reinforcing layer is tapered outward from an inner portion thereof in the radial direction. When a reference position is defined as a position on an outer surface of the tire, the position corresponding to a radially outer edge of a contact surface on which the tire and a rim contact with each other when the tire is mounted on the rim and inflated with air to a normal internal pressure, each of the outer ends of the apexes is disposed inward of the reference position in the radial direction. An inner end of each reinforcing layer is disposed inward of a position that is distant from the outer end of a corresponding one of the apexes by 10 mm in a radially outward direction.

According to a third aspect, still another pneumatic tire of the present invention includes: a tread; a pair of sidewalls; a pair of clinches; a pair of beads; a carcass; a pair of strips; and a pair of support layers. The sidewalls extend almost inward from ends, respectively, of the tread in a radial direction. The clinches extend almost inward from ends of the sidewalls, respectively, in the radial direction. The beads are disposed inward of the clinches, respectively, in an axial direction. The carcass is extended on and between one of the beads and the other of the beads along inner sides of the tread and the sidewalls. The beads include: cores; and apexes disposed outward of the cores in the radial direction. The carcass includes a carcass ply. The carcass ply is turned up around the cores from an inner side toward an outer side in the axial direction. The carcass ply includes a main portion and turned-up portions by the carcass ply being turned up. The strips extend along the main portion in the radial direction in portions radially outward of the apexes, respectively. The support layers are disposed outward of the strips, respectively, in the axial direction. When a reference position is defined as a position on an outer surface of the tire, the position corresponding to a radially outer edge of a contact surface on which the tire and a rim contact with each other when the tire is mounted on the rim and inflated with air to a normal internal pressure, an outer end of each apex is disposed inward of the reference position in the radial direction. Each support layer extends almost outward from a portion near the reference position in the radial direction.

Advantageous Effects of the Invention

In the pneumatic tire according to the present invention, the second apexes are disposed between the turned-up portions of the carcass ply and the clinches. In the tire, the turned-up portions are positioned in the axially inner portions as compared to turned-up portions of a conventional tire. This positioning allows concentration of distortion on the turned-up portions to be inhibited. Generation of loosing can be reduced, whereby the tire is excellent in durability.

In the tire, each turned-up portion is disposed between the first apex and the second apex. The turned-up portion contacts with the main portion of the carcass ply in a portion radially outward of the outer end of the first apex. The outer end of the second apex is disposed outward of the end of the turned-up portion in the radial direction. The first apex of the tire is smaller than an apex of a conventional tire. The small first apex allows the main portion to have an appropriate contour (also referred to as a case line). Specifically, in the tire, on a cross-section perpendicular to the circumferential direction, the main portion has a contour that is similar to a single arc. The contour allows concentration of distortion to be inhibited. The contour contributes to durability. Further, the contour allows formation of a portion having a specific stiffness in the sidewall portion to be inhibited. In the tire, the entirety of the sidewall portions is appropriately deformed. In the tire, the entirety of the sidewall portions effectively contributes to stiffness. Such a deformation contributes to steering stability of the tire.

The tire includes the strips that extend from the beads along the carcass. The position of the outer end of each strip is equal, in the radial direction, to the position at which the maximum width is obtained, or the outer end is disposed radially inward of the position at which the maximum width is obtained. The second apex is disposed between the strip and the first apex. The strips, together with the second apexes, contribute to in-plane torsional stiffness of the tire. The strips and the second apexes contribute to steering stability.

In the tire, the clinches having a thickness increased for durability need not be used. In the tire, the bead portion has a small volume. The small volume allows heat generation to be reduced. The reduction in heat generation contributes to durability of the tire.

The small volume described above allows the bead portion to have a flexible structure. The flexible structure causes vertical stiffness to be low in the tire. Thus, vibration is reduced, whereby noise in the tire is reduced. Particularly, in the tire, a noise in a frequency range from 80 Hz to 100 Hz can be reduced. The tire is excellent in quietness.

Thus, according to the present invention, the pneumatic tire that has quietness and durability improved without reducing steering stability, can be obtained.

In another pneumatic tire according to the present invention, the small apexes are used, and the positions of the reinforcing layers relative to the apexes are appropriately adjusted. The thickness of the bead portion can be reduced, whereby the weight of the tire can be reduced. Since a high in-plane torsional stiffness can be obtained, steering stability is advantageous in the tire although the lateral stiffness is low. According to the present invention, the pneumatic tire having its weight reduced without reducing steering stability, can be obtained.

In still another pneumatic tire according to the present invention, the outer end of the apex is disposed inward of the reference position in the radial direction. In the tire, an apex having a length less than a conventional apex is used. The apexes contribute to reduction in weight. The tire has the strips that extend along the main portion in the radial direction in portions radially outward of the apexes. The strips contribute to in-plane torsional stiffness. The tire quickly reacts to an operation of a steering wheel. The tire is excellent in steering stability. The tire further include the support layers that extend almost outward from portions near the reference position in the radial direction in portions axially outward of the strips. The support layers allow enhancement of stability in a state where acceleration is high as in a case where a steering wheel is turned when a speed is about 80 km/h. The support layers contribute to further improvement of steering stability. According to the present invention, a pneumatic tire that has steering stability improved while inhibiting increase of the mass, can be obtained.

DESCRIPTION OF EMBODIMENTS

The following will describe in detail the present invention based on preferred embodiments with reference where appropriate to the accompanying drawing.

First Embodiment

Figure 1:
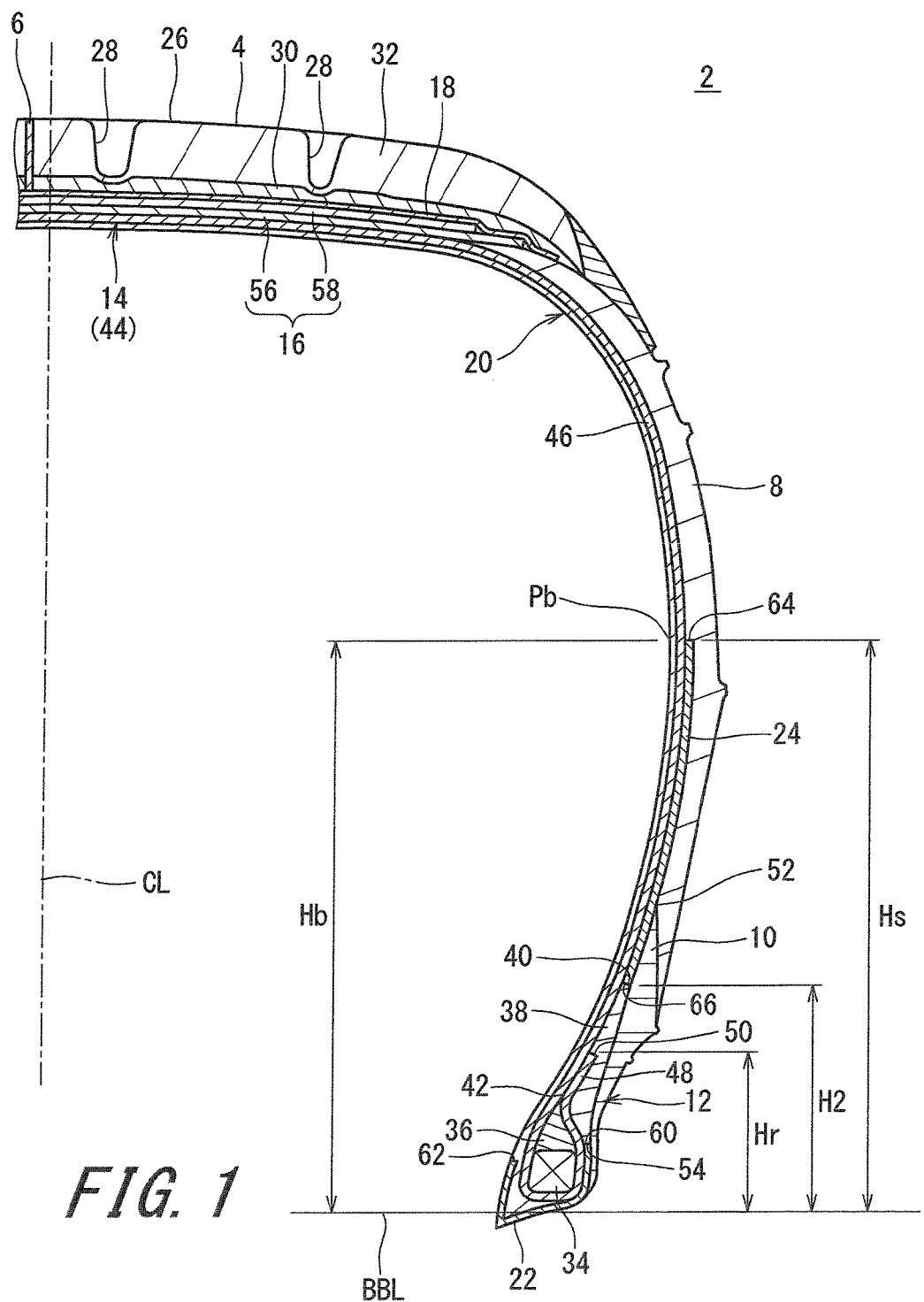
FIG. 1 is a cross-sectional view of a part of a pneumatic tire according to a first embodiment of the present invention.

FIG. 1 shows a pneumatic tire 2 according to a first embodiment. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. The shape of the tire 2 is symmetric with respect to the equator plane except for a tread pattern. In FIG. 1, a solid line BBL represents the bead base line. The bead base line is a line that defines a rim diameter (see JATMA) of a rim (not shown) on which the tire 2 is mounted. The bead base line extends in the axial direction.

The tire 2 includes a tread 4, a penetration portion 6, sidewalls 8, clinches 10, beads 12, a carcass 14, a belt 16, a band 18, an inner liner 20, chafers 22, and strips 24. The tire 2 is of a tubeless type. The tire 2 is mounted to passenger cars.

In FIG. 1, reference character Pb represents a point on the inner surface of the tire 2. At the point Pb, the tire 2 has the axially maximum width represented on the profile of the inner surface. In the tire 2, the maximum width is represented as the length, in the axial direction, between the left and the right side surfaces (outer surfaces of the sidewalls 8) at the point Pb. In other words, the point Pb represents a position at which the tire 2 has the maximum width.

The tread 4 has a shape that projects radially outward. The tread 4 forms a tread surface 26 that can contact with a road surface. The tread 4 has grooves 28 formed therein. A tread pattern is formed by the grooves 28. The tread 4 includes a base layer 30 and a cap layer 32. The cap layer 32 is disposed outward of the base layer 30 in the radial direction. The cap layer 32 is layered over the base layer 30. The base layer 30 is formed of a crosslinked rubber excellent in adhesiveness. A typical base rubber of the base layer 30 is natural rubber. The cap layer 32 is formed of a crosslinked rubber excellent in wear resistance, heat resistance, and grip performance.

The penetration portion 6 penetrates through the tread 4. One end of the penetration portion 6 is exposed on the tread surface 26. The other end of the penetration portion 6 contacts with the band 18. The penetration portion 6 extends in the circumferential direction. The penetration portion 6 is annular. The tire 2 may include a plurality of the penetration portions 6 which do not form an annular shape and are spaced from each other in the circumferential direction. The penetration portion 6 is formed of a conductive crosslinked rubber.

The sidewalls 8 extend almost inward from the ends of the tread 4 in the radial direction. The radially inner side ends of the sidewalls 8 are joined to the clinches 10. The sidewalls 8 are formed of a crosslinked rubber excellent in cut resistance and weather resistance. The sidewalls 8 prevent damage to the carcass 14.

The clinches 10 are disposed almost inward of the sidewalls 8 in the radial direction. The clinches 10 extend almost inward from the ends of the sidewalls 8 in the radial direction. The clinches 10 are disposed outward of the beads 12 and the carcass 14 in the axial direction. The clinches 10 are formed of a crosslinked rubber excellent in wear resistance. The clinches 10 contact with flanges of a rim.

The beads 12 are disposed inward of the clinches 10 in the axial direction. Each bead 12 includes a core 34, a first apex 36, and a second apex 38. The core 34 is ring-shaped, and includes a non-stretchable wound wire. A typical material of the wire is steel. The first apex 36 extends outward from the core 34 in the radial direction. The first apex 36 is tapered radially outward. The second apex 38 is disposed axially outward of the first apex 36. The second apex 38 is disposed between the clinch 10 and the carcass 14 in the axial direction. In the tire 2, an outer end 40 of the second apex 38 is disposed radially outward of an outer end 42 of the first apex 36.

In the tire 2, the first apex 36 is formed by a rubber composition being crosslinked. That is, the first apex 36 is a crosslinked rubber. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the first apex 36 preferably includes sulfur. Molecules of the rubber are crosslinked by sulfur. In addition to or instead of sulfur, another crosslinking agent may be used. The crosslinking by electron beams may be performed.

The rubber composition of the first apex 36 preferably includes sulfur and a vulcanization accelerator. For example, a sulfenamide-based vulcanization accelerator, a guanidine-based vulcanization accelerator, a thiazole-based vulcanization accelerator, a thiuram-based vulcanization accelerator, and a dithiocarbamate vulcanization accelerator may be used.

The rubber composition of the first apex 36 includes a reinforcing agent. The reinforcing agent is typically carbon black. Carbon black such as FEF, GPF, HAF, ISAF, and SAF can be used. From the viewpoint of strength of the first apex 36, an amount of the carbon black per 100 parts by weight of the base rubber is preferably greater than or equal to 5 parts by weight. From the viewpoint of flexibility of the first apex 36, the amount of the carbon black is preferably not greater than 50 parts by weight. In addition to or instead of the carbon black, silica may be used. In this case, dry silica and wet silica can be used.

The rubber composition of the first apex 36 includes a softener. Preferable examples of the softener include paraffinic process oils, naphthenic process oils, and aromatic process oils. From the viewpoint of flexibility of the first apex 36, an amount of the softener per 100 parts by weight of the base rubber is preferably greater than or equal to 10 parts by weight. From the viewpoint of strength of the first apex 36, the amount of the softener is preferably not greater than 40 parts by weight.

To the rubber composition of the first apex 36, stearic acid, zinc oxide, an antioxidant, a wax, a crosslinking activator, and the like are added as appropriate.

In the tire 2, the second apex 38 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the second apex 38 preferably includes sulfur. Molecules of the rubber are crosslinked by sulfur. In addition to or instead of sulfur, another crosslinking agent may be used. The crosslinking by electron beams may be performed.

The rubber composition of the second apex 38 preferably includes sulfur and a vulcanization accelerator. For example, a sulfenamide-based vulcanization accelerator, a guanidine-based vulcanization accelerator, a thiazole-based vulcanization accelerator, a thiuram-based vulcanization accelerator, and a dithiocarbamate vulcanization accelerator may be used.

The rubber composition of the second apex 38 includes a reinforcing agent. The reinforcing agent is typically carbon black. Carbon black such as FEF, GPF, HAF, ISAF, and SAF can be used. From the viewpoint of strength of the second apex 38, an amount of the carbon black per 100 parts by weight of the base rubber is preferably greater than or equal to 5 parts by weight. From the viewpoint of flexibility of the second apex 38, the amount of the carbon black is preferably not greater than 50 parts by weight. In addition to or instead of the carbon black, silica may be used. In this case, dry silica and wet silica can be used.

The rubber composition of the second apex 38 includes a softener. Preferable examples of the softener include paraffinic process oils, naphthenic process oils, and aromatic process oils. From the viewpoint of flexibility of the second apex 38, an amount of the softener per 100 parts by weight of the base rubber is preferably greater than or equal to 10 parts by weight. From the viewpoint of strength of the second apex 38, the amount of the softener is preferably not greater than 40 parts by weight.

To the rubber composition of the second apex 38, stearic acid, zinc oxide, an antioxidant, a wax, a crosslinking activator, and the like are added as appropriate.

The carcass 14 includes a carcass ply 44. The carcass ply 44 is extended on and between the beads 12 on both the sides. The carcass ply 44 extends along the inner sides of the tread 4 and the sidewalls 8. The carcass ply 44 is turned up around each core 34 from the inner side toward the outer side in the axial direction. By this turning-up, the carcass ply 44 includes a main portion 46 and turned-up portions 48. In the tire 2, ends 50 of the turned-up portions 48 are each disposed radially inward of the position Pb at which the maximum width is obtained. The ends 50 of the turned-up portions 48 are disposed inward of outer ends 52 of the clinches 10 in the radial direction. Each end 50 of the turned-up portion 48 is disposed between an inner end 54 and the outer end 40 of the second apex 38 in the radial direction. The ends 50 of the turned-up portions 48 are disposed near the cores 34. The carcass 14 has a so-called "low turn-up structure".

The carcass ply 44 includes multiple cords aligned with each other, and a topping rubber. An absolute value of an angle of each cord relative to the equator plane is 75° to 90°. In other words, the carcass 14 forms a radial structure. The cords are formed of an organic fiber. Preferable examples of the organic fiber include polyester fibers, nylon fibers, rayon fibers, polyethylene naphthalate fibers, and aramid fibers. The carcass 14 may include two or more carcass plies 44. From the viewpoint of influence on the mass, the carcass 14 is preferably formed by one carcass ply 44.

The belt 16 is disposed inward of the tread 4 in the radial direction. The belt 16 is layered over the carcass 14. The belt 16 reinforces the carcass 14. The belt 16 includes an inner layer 56 and an outer layer 58. As is apparent from FIG. 1, the width of the inner layer 56 is slightly greater than the width of the outer layer 58 in the axial direction. Each of the inner layer 56 and the outer layer 58 includes multiple cords aligned with each other, and a topping rubber, which is not shown. Each cord is tilted relative to the equator plane. An absolute value of the tilt angle is typically greater than or equal to 10° and not greater than 35°. A direction in which the cords of the inner layer 56 are tilted relative to the equator plane is opposite to a direction in which the cords of the outer layer 58 are tilted relative to the equator plane. A preferable material of the cords is steel. An organic fiber may be used for the cords. The width of the belt 16 in the axial direction is preferably greater than or equal to 0.7 times the maximum width of the tire 2. The belt 16 may include three or more layers.

The band 18 is disposed outward of the belt 16 in the radial direction. The width of the band 18 is greater than the width of the belt 16 in the axial direction. The band 18 includes a cord and a topping rubber, which are not shown. The cord is helically wound. The band 18 has a so-called jointless structure. The cord extends substantially in the circumferential direction. An angle of the cord relative to the circumferential direction is less than or equal to 5° and more preferably less than or equal to 2°. The belt 16 is held by the cord, whereby lifting of the belt 16 is inhibited. The cord is formed of an organic fiber. Preferable examples of the organic fiber include nylon fibers, polyester fibers, rayon fibers, polyethylene naphthalate fibers, and aramid fibers.

The inner liner 20 is disposed inward of the carcass 14. The inner liner 20 is joined to the inner surface of the carcass 14. The inner liner 20 is formed of a crosslinked rubber excellent in airtightness. A typical base rubber of the inner liner 20 is an isobutylene-isoprene-rubber or halogenated isobutylene-isoprene-rubber. The inner liner 20 maintains internal pressure of the tire 2.

The chafers 22 are disposed near the beads 12. As is apparent from the drawings, the chafers 22 are turned up around the beads 12 from the inner side toward the outer side in the axial direction. One end 60 of each chafer 22 is disposed outward of the carcass 14 in the axial direction. The one end 60 of the chafer 22 is disposed between the turned-up portion 48 and the clinch 10 in the axial direction. The other end 62 of each chafer 22 is disposed inward of the carcass 14 in the axial direction. The other end 62 of the chafer 22 is disposed inward of the outer end 42 of the first apex 36 in the radial direction. When the tire 2 is mounted on a rim, the chafers 22 contact with the rim. By this contact, portions near the beads 12 are protected. In the present embodiment, the chafers 22 are formed of a fabric and a rubber impregnated into the fabric.

The strips 24 are disposed outward of the main portion 46 of the carcass ply 44 in the axial direction. The strips 24 extend almost outward from the beads 12 along the main portion 46 in the radial direction. An outer end 64 of each strip 24 is disposed outward of the outer end 52 of the clinch 10 in the radial direction. An inner end 66 of each strip 24 is disposed between the main portion 46 and the clinch 10 in the axial direction. The inner end 66 of the strip 24 is disposed outward of the end 50 of the turned-up portion 48 in the radial direction.

In the tire 2, the strips 24 are formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the strips 24 preferably includes sulfur. Molecules of the rubber are crosslinked by sulfur. In addition to or instead of sulfur, another crosslinking agent may be used. The crosslinking by electron beams may be performed.

The rubber composition of the strips 24 preferably includes sulfur and a vulcanization accelerator. For example, a sulfenamide-based vulcanization accelerator, a guanidine-based vulcanization accelerator, a thiazole-based vulcanization accelerator, a thiuram-based vulcanization accelerator, and a dithiocarbamate vulcanization accelerator may be used.

The rubber composition of the strips 24 includes a reinforcing agent. The reinforcing agent is typically carbon black. Carbon black such as FEF, GPF, HAF, ISAF, and SAF can be used. From the viewpoint of strength of the strips 24, an amount of the carbon black per 100 parts by weight of the base rubber is preferably greater than or equal to 5 parts by weight. From the viewpoint of flexibility of the strips 24, the amount of the carbon black is preferably not greater than 50 parts by weight. In addition to or instead of the carbon black, silica may be used. In this case, dry silica and wet silica can be used.

The rubber composition of the strips 24 includes a softener. Preferable examples of the softener include paraffinic process oils, naphthenic process oils, and aromatic process oils. From the viewpoint of flexibility of the strips 24, an amount of the softener per 100 parts by weight of the base rubber is preferably greater than or equal to 10 parts by weight. From the viewpoint of strength of the strips 24, the amount of the softener is preferably not greater than 40 parts by weight.

To the rubber composition of the strips 24, stearic acid, zinc oxide, an antioxidant, a wax, a crosslinking activator, and the like are added as appropriate.

Figure 2:
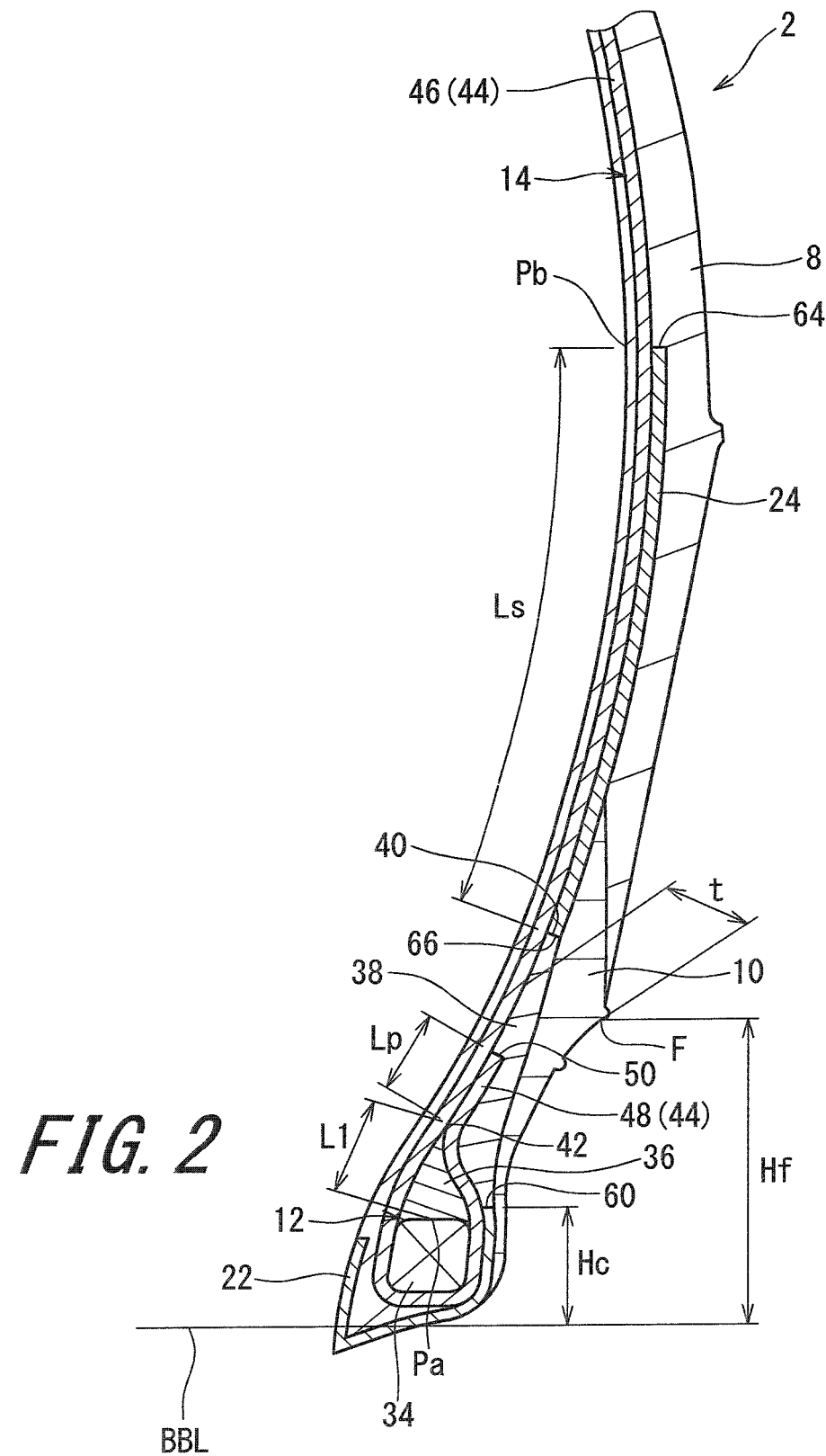
FIG. 2 is an enlarged cross-sectional view of a part of the tire shown in FIG. 1.

FIG. 2 shows a part of the tire 2 shown in FIG. 1. FIG. 2 shows the bead 12 portion of the tire 2. In FIG. 2, the up-down direction represents the radial direction of the tire 2, the left-right direction represents the axial direction of the tire 2, and the direction perpendicular to the surface of the drawing sheet represents the circumferential direction of the tire 2.

In the tire 2, the second apexes 38 are disposed between the turned-up portions 48 of the carcass ply 44 and the clinches 10. In the tire 2, the turned-up portions 48 are positioned in the axially inner portions as compared to turned-up portions of a conventional tire. This positioning allows concentration of distortion on the turned-up portions 48 to be inhibited. Generation of loosing can be reduced, whereby the tire 2 is excellent in durability.

In the tire 2, each turned-up portion 48 is disposed between the first apex 36 and the second apex 38. The turned-up portion 48 contacts with the main portion 46 of the carcass ply 44 in a portion radially outward of the outer end 42 of the first apex 36. The outer end 40 of the second apex 38 is disposed outward of the end 50 of the turned-up portion 48 in the radial direction. The first apex 36 of the tire 2 is smaller than an apex of a conventional tire. The small first apex 36 allows the main portion 46 to have an appropriate contour (also referred to as a case line). Specifically, in the tire 2, on a cross-section perpendicular to the circumferential direction, the contour of the main portion 46 from the vicinity of the end of the belt 16 to the vicinity of the core 34 is expressed as an arc of a circle having the center disposed inward of the inner surface of the tire 2. In other words, on the cross-section of the tire 2, the main portion 46 has a contour that is similar to a single arc. The contour allows concentration of distortion to be inhibited. The contour contributes to durability.

As described above, in the tire 2, the main portion 46 has a contour that is similar to a single arc. The contour allows formation of a portion having a specific stiffness in the sidewall 8 portion of the tire 2 to be inhibited. In the tire 2, the entirety of the sidewall 8 portions is appropriately deformed. In the tire 2, the entirety of the sidewall 8 portions effectively contributes to stiffness. Such a deformation contributes to steering stability of the tire 2.

The tire 2 includes the strips 24 that extend from the beads 12 along the carcass 14. The position of the outer end 64 of each strip 24 is equal, in the radial direction, to the position Pb at which the maximum width is obtained, or the outer end 64 is disposed radially inward of the position Pb at which the maximum width is obtained. The second apex 38 is disposed between the strip 24 and the first apex 36. The strip 24 extends radially outward from the outer end 40 of the second apex 38 along the main portion 46. The strips 24, together with the second apexes 38, contribute to in-plane torsional stiffness of the tire 2. The strips 24 and the second apexes 38 contribute to steering stability. Further, in the tire 2, the outer end 64 is not disposed radially outward of the position Pb at which the maximum width is obtained, whereby influence of the strips 24 on the mass and rolling resistance is reduced.

In the tire 2, the clinches 10 having a thickness increased for durability need not be used. In the tire 2, the bead 12 portion has a volume less than that of a conventional tire. The small volume allows heat generation to be reduced. The reduction in heat generation contributes to durability of the tire 2.

The small volume described above allows the bead 12 portion to have a flexible structure. The flexible structure causes vertical stiffness to be low in the tire 2. Thus, vibration is reduced, whereby noise in the tire 2 is reduced. Particularly, in the tire 2, a noise in a frequency range from 80 Hz to 100 Hz can be reduced. The tire 2 is excellent in quietness.

Thus, in the tire 2, the first apexes 36, the second apexes 38, and the strips 24 contribute to appropriate contour of the main portion 46, improvement of in-plane torsional stiffness, and reduction in volume of the bead 12 portions. Thus, in the tire 2, quietness and durability are improved without reducing steering stability. That is, according to the present invention, the pneumatic tire 2 that has quietness and durability improved without reducing steering stability can be obtained.

In the tire 2, a complex elastic modulus Es of the strip 24 is higher than or equal to 60 MPa and not higher than 70 MPa. When the elastic modulus Es is set to be higher than or equal to 60 MPa, the strips 24 contribute to in-plane torsional stiffness. The tire 2 is excellent in steering stability. When the elastic modulus Es is set to be not higher than 70 MPa, influence of the strips 24 on stiffness can be reduced. In the tire 2, ride comfort is appropriately maintained.

In the present invention, the complex elastic modulus Es of the strip 24 is measured in compliance with the standard of "JIS K 6394". The measurement conditions are as follows. A complex elastic modulus E1 of the first apex 36 and a complex elastic modulus E2 of the second apex 38 as described below are measured in the same manner as for the complex elastic modulus Es.

Viscoelasticity spectrometer: "VESF-3" of Iwamoto Seisakusho
Initial strain: 10%
Dynamic strain: ±1%
Frequency: 10 Hz
Deformation mode: tension
Measurement temperature: 70° C.

In the tire 2, the complex elastic modulus E1 of the first apex 36 is preferably higher than or equal to 60 MPa and preferably not higher than 70 MPa. When the elastic modulus E1 is set to be higher than or equal to 60 MPa, the first apexes 36 contribute to supporting of the tire 2. The tire 2 is excellent in steering stability. When the elastic modulus E1 is set to be not higher than 70 MPa, influence of the first apexes 36 on stiffness is reduced. In the tire 2, ride comfort is appropriately maintained.

In the tire 2, the complex elastic modulus E2 of the second apex 38 is preferably higher than or equal to 60 MPa and preferably not higher than 70 MPa. When the elastic modulus E2 is set to be higher than or equal to 60 MPa, the second apexes 38 contribute to in-plane torsional stiffness. The tire 2 is excellent in steering stability. When the elastic modulus E2 is set to be not higher than 70 MPa, influence of the second apexes 38 on stiffness is reduced. In the tire 2, ride comfort is appropriately maintained.

As described above, in the tire 2, the strips 24 are formed of the crosslinked rubber. The second apexes 38 are formed of the crosslinked rubber. The first apexes 36 are formed of the crosslinked rubber. From the viewpoint of productivity, the second apex 38 is preferably formed of a crosslinked rubber similar to the crosslinked rubber of the strip 24. From the same viewpoint, the first apex 36 is preferably formed of a crosslinked rubber similar to the crosslinked rubber of the strip 24. Particularly preferably, the first apexes 36 and the second apexes 38 are each formed of a crosslinked rubber similar to the crosslinked rubber of the strips 24, that is, the first apexes 36, the second apexes 38, and the strips 24 are formed by the same rubber composition being crosslinked.

In FIG. 2, reference character F represents a position, near each bead 12, at which the thickness from the carcass 14 to the side surface is maximum. A double-headed arrow Hf represents the height, in the radial direction, from the bead base line to the position F. The height Hf corresponds to the height of a flange of a rim into which the tire 2 is fitted. The height Hf is set to be greater than or equal to 25 mm and not greater than 30 mm in general. A double-headed arrow Hc represents the height, in the radial direction, from the bead base line to the one end 60 of the chafer 22.

The tire 2 is fitted into a rim, and used. In a use state, great distortion is generated in the tire 2 at a position corresponding to the outer end, in the radial direction, of a flange of the rim. As described above, in the tire 2, at the position F, the thickness (a double-headed arrow t in FIG. 2) from the carcass 14 to the side surface is maximum. In the tire 2, influence of great distortion in the use state is effectively prevented. The tire 2 is excellent in durability.

In the tire 2, the one end 60 of the chafer 22 is preferably disposed radially inward of the position F described above. Thus, influence of the chafers 22 on cost and the mass is reduced, and, further, concentration of distortion on the one end 60 of the chafer 22 is prevented. Since generation of loosing in the chafers is prevented, the tire 2 is excellent in durability. From this viewpoint, the height Hc is preferably less than or equal to 22 mm and more preferably less than or equal to 15 mm.

As described above, the chafers 22 contact with a rim. In the use state, the chafers 22 are pressed against the rim. In the tire 2, the one end 60 of the chafer 22 is sandwiched between the turned-up portion 48 and the clinch 10. The one end 60 of the chafer 22 does not contact with the rim, whereby removal of the chafers 22 from the tire 2 is effectively prevented in the tire 2. The tire 2 is excellent in durability. From this viewpoint, the above-described height Hc is preferably not less than 5 mm and more preferably not less than 8 mm.

In FIG. 2, a double-headed arrow L1 represents the length of the first apex 36. The length L1 is represented as a length from the center (reference character Pa in FIG. 2), in the axial direction, of the bottom surface of the first apex 36 to the outer end 42 thereof.

In the tire 2, the length L1 is preferably greater than or equal to 5 mm and preferably not greater than 15 mm. When the length L1 is set to be greater than or equal to 5 mm, the first apexes 36 can effectively contribute to lateral stiffness. The tire 2 is excellent in steering stability. When the length L1 is set to be not greater than 15 mm, the carcass 14 having an appropriate contour can be obtained. The carcass 14 contributes to durability and steering stability of the tire 2. Further, the small first apexes 36 contribute to reduction of noise.

In FIG. 2, a double-headed arrow Lp represents the length from the outer end 42 of the first apex 36 to the end 50 of the turned-up portion 48. As described above, the turned-up portion 48 contacts with the main portion 46 in the portion radially outward of the outer end 42 of the first apex 36. The length Lp also represents the length over which the main portion 46 and the turned-up portion 48 overlap each other.

In the tire 2, the length Lp is preferably greater than or equal to 10 mm. Thus, contact of the turned-up portion 48 with the main portion 46 is sufficient. This sufficient contact prevents generation of loosing in the turned-up portions 48. From the viewpoint of influence on the mass and cost, the length Lp is preferably not greater than 20 mm and more preferably not greater than 15 mm.

In FIG. 2, a double-headed arrow Ls represents the length of the strip 24. The length Ls is represented as the length from the inner end 66 of the strip 24 to the outer end 64 thereof. The length Ls is measured along the strip 24.

In the tire 22, the length Ls is preferably greater than or equal to 40 mm and preferably not greater than 70 mm. When the length Ls is set to be greater than or equal to 40 mm, the strips 24 contribute to in-plane torsional stiffness. The tire 22 is excellent in steering stability. From this viewpoint, the length Ls is more preferably greater than or equal to 50 mm. When the length Ls is set to be not greater than 70 mm, influence of the strips 24 on stiffness is reduced. In the tire 2, ride comfort is appropriately maintained. From this viewpoint, the length Ls is more preferably not greater than 60 mm. In the tire 2, from the viewpoint of steering stability and the mass, the thickness of the strip 24 is preferably greater than or equal to 0.5 mm and preferably not greater than 2 mm.

In FIG. 1, a double-headed arrow Hb represents the height, in the radial direction, from the bead base line to the position Pb at which the maximum width is obtained. The height Hb represents the reference height in the present invention. A double-headed arrow Hs represents the height, in the radial direction, from the bead base line to the outer end 64 of the strip 24. A double-headed arrow H2 represents the height, in the radial direction, from the bead base line to the outer end 40 of the second apex 38. A double-headed arrow Hr represents the height, in the radial direction, from the bead base line to the end 50 of the turned-up portion 48.

As described above, in the tire 2, the position of the outer end 64 of the strip 24 is equal, in the radial direction, to the position Pb at which the maximum width is obtained, or the outer end 64 of the strip 24 is disposed radially inward of the position Pb at which the maximum width is obtained. Therefore, a ratio of the height Hs to the reference height Hb is less than or equal to 1. Thus, influence of the strips 24 on rolling resistance is reduced. From the viewpoint of obtaining a sufficient in-plane torsional stiffness, the ratio is preferably not less than 0.7.

In the tire 2, from the viewpoint of appropriate contribution of the second apexes 38 to stiffness, the height H2 is preferably greater than or equal to 30 mm and preferably not greater than 40 mm.

In the tire 2, from the viewpoint of appropriate contribution of the turned-up portions 48 to stiffness, the height Hr is preferably greater than or equal to 20 mm and preferably not greater than 80 mm.

In the present invention, the dimension and angle of each component of the tire 2 are measured in a state where the tire 2 is mounted on a normal rim and inflated with air to a normal internal pressure. During the measurement, no load is applied to the tire 2. In the description herein, the normal rim means a rim specified in a standard with which the tire 2 complies. The "standard rim" in the JATMA standard, the "Design Rim" in the TRA standard, and the "Measuring Rim" in the ETRTO standard are normal rims. In the description herein, the normal internal pressure means an internal pressure specified in the standard with which the tire 2 complies. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. When the tire 2 is for passenger cars, the dimensions and angles are measured in a state where the internal pressure is 180 kPa. Dimensions and angles of components for a pneumatic tire according to a second embodiment described below and for a pneumatic tire according to a third embodiment described below are also measured in the same manner as for the tire 2.

Second Embodiment

Figure 3:
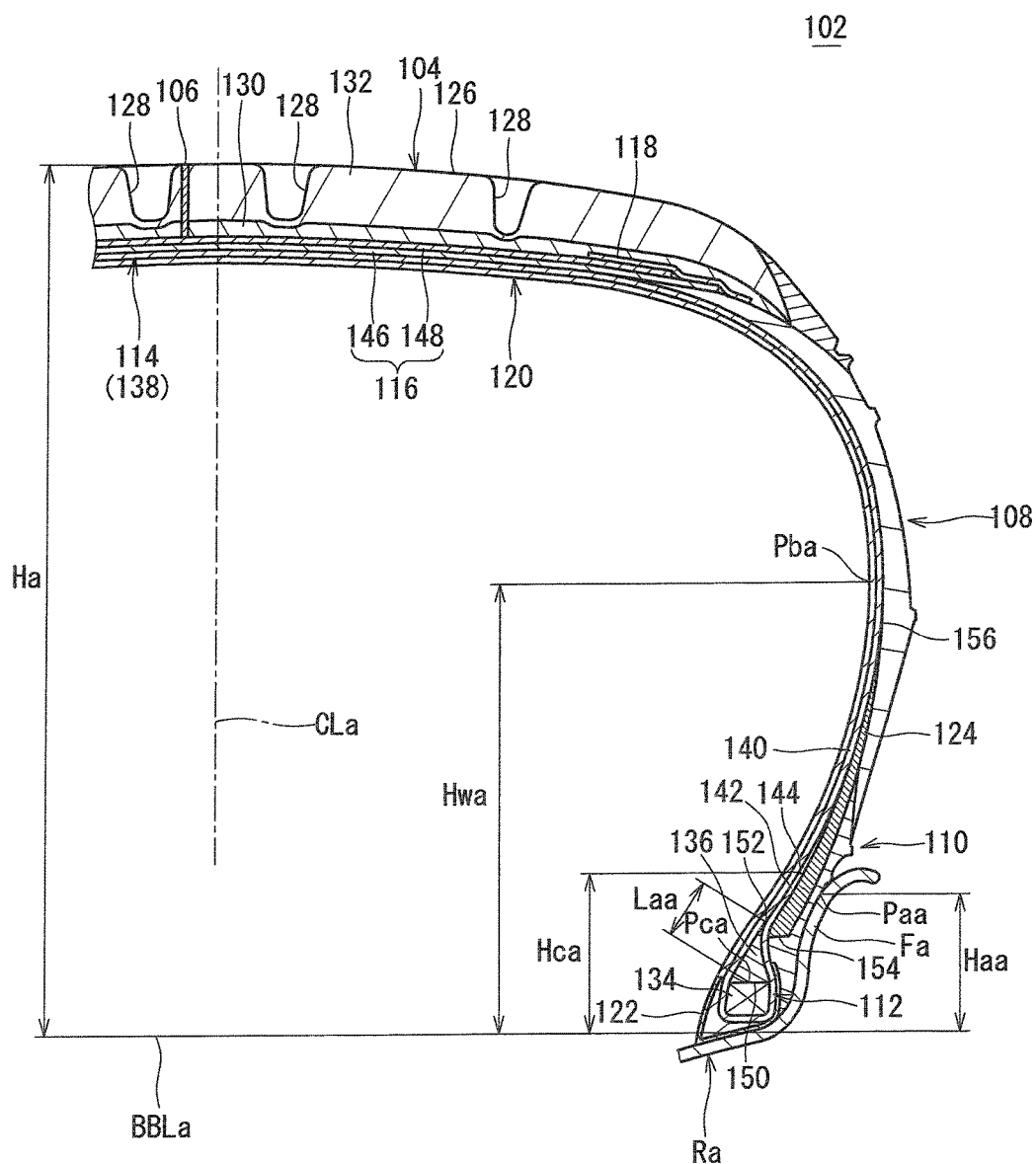
FIG. 3 is a cross-sectional view of a part of a pneumatic tire according to a second embodiment of the present invention.

FIG. 3 shows a pneumatic tire 102 according to a second embodiment. In FIG. 3, the up-down direction represents the radial direction of the tire 102, the left-right direction represents the axial direction of the tire 102, and the direction perpendicular to the surface of the drawing sheet represents the circumferential direction of the tire 102. In FIG. 3, an alternate long and short dash line CLa represents the equator plane of the tire 102. The shape of the tire 102 is symmetric with respect to the equator plane except for a tread pattern.

The tire 102 is mounted on a rim Ra. The rim Ra is a normal rim. The tire 102 is inflated with air. An internal pressure of the tire 102 is a normal internal pressure.

In the tire 102 mounted on the rim Ra, a part of the tire 102 is in contact with the rim Ra. In FIG. 3, reference character Paa represents a specific position on the outer surface of the tire 102. The position Paa corresponds to a radially outer edge of a surface on which the tire 102 and the rim Ra contact with each other when the tire 2 is mounted on the rim Ra and inflated with air to a normal internal pressure. In the present invention, the position Paa is referred to as the reference position.

In FIG. 3, a solid line BBLa represents the bead base line. The bead base line is a line that defines the rim diameter (see JATMA) of the rim Ra on which the tire 102 is mounted. The bead base line extends in the axial direction. A double-headed arrow Haa represents the height, in the radial direction, from the bead base line to the reference position Paa. The height Haa typically ranges from 20 mm to 25 mm. A double-headed arrow Ha represents the height, in the radial direction, from the bead base line to the radially outer end (also referred to as the equator) of the tire 102. The height Ha is a cross-sectional height of the tire 102.

The tire 102 includes a tread 104, a penetration portion 106, a pair of sidewalls 108, a pair of clinches 110, a pair of beads 112, a carcass 114, a belt 116, a pair of edge bands 118, an inner liner 120, a pair of chafers 122, and a pair of reinforcing layers 124. The tire 102 is of a tubeless type. The tire 102 is mounted to passenger cars.

In FIG. 3, reference character Pba represents a specific position on the inner surface of the tire 102. At the position Pba, the tire 102 has the axially maximum width represented on the profile of the inner surface. In the tire 102, the length, in the axial direction, between the left and right side surfaces (outer surfaces of the sidewalls 108) at the position Pba is represented as the maximum width (also referred to as a cross-sectional width) of the tire 102. In the present invention, the position Pba is a position at which the tire 102 has the maximum width.

The tread 104 has a shape that projects radially outward. The tread 104 forms a tread surface 126 that can contact with a road surface. The tread 104 has grooves 128 formed therein. A tread pattern is formed by the grooves 128. The tread 104 includes a base layer 130 and a cap layer 132. The cap layer 132 is disposed outward of the base layer 130 in the radial direction. The cap layer 132 is layered over the base layer 130. The base layer 130 is formed of a crosslinked rubber excellent in adhesiveness. A typical base rubber of the base layer 130 is natural rubber. The cap layer 132 is formed of a crosslinked rubber excellent in wear resistance, heat resistance, and grip performance.

The penetration portion 106 penetrates through the tread 104. One end of the penetration portion 106 is exposed on the tread surface 126. The other end of the penetration portion 106 contacts with the belt 116. The penetration portion 106 extends in the circumferential direction. In other words, the penetration portion 106 is annular. The tire 102 may include a plurality of the penetration portions 106 which do not form an annular shape and are spaced from each other in the circumferential direction. The penetration portion 106 is formed of a conductive crosslinked rubber.

The sidewalls 108 extend almost inward from the ends, respectively, of the tread 104 in the radial direction. The radially outer side portions of the sidewalls 108 are joined to the tread 104. The radially inner side portions of the sidewalls 108 are joined to the clinches 110. The sidewalls 108 are formed of a crosslinked rubber excellent in cut resistance and weather resistance. The sidewalls 108 prevent damage to the carcass 114.

The clinches 110 extend almost inward from the ends of the sidewalls 108, respectively, in the radial direction. The clinches 110 are disposed outward of the beads 112 and the carcass 114 in the axial direction. The clinches 110 are formed of a crosslinked rubber excellent in wear resistance. The clinch 110 contacts with a flange Fa of the rim Ra.

The beads 112 are disposed inward of the clinches 110, respectively, in the axial direction. The clinches 110 extend almost inward from the ends of the sidewalls 108 in the radial direction. Therefore, the beads 112 are disposed inward of the sidewalls 108 in the radial direction. Each bead 112 includes a core 134 and an apex 136. The core 134 is ring-shaped, and includes a non-stretchable wound wire. A typical material of the wire is steel. The apex 136 is disposed outward of the core 134 in the radial direction. The apex 136 extends outward from the core 134 in the radial direction. The apex 136 is tapered radially outward. The apex 136 is formed of a highly hard crosslinked rubber. The apex 136 is also referred to as a first apex.

In the tire 102, the apex 136 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the apex 136 includes a reinforcing agent. The reinforcing agent is typically carbon black. Carbon black such as FEF, GPF, HAF, ISAF, and SAF can be used. From the viewpoint of strength of the apex 136, an amount of the carbon black per 100 parts by weight of the base rubber is preferably greater than or equal to 5 parts by weight. From the viewpoint of flexibility of the apex 136, the amount of the carbon black is preferably not greater than 50 parts by weight. From the viewpoint of reduction in heat generation caused by deformation, silica may be used in addition to or instead of the carbon black. In this case, dry silica and wet silica can be used.

To the rubber composition of the apex 136, a crosslinking agent, a softener, stearic acid, zinc oxide, an antioxidant, a wax, a crosslinking activator, and the like are added as appropriate.

The carcass 114 includes one carcass ply 138. The carcass ply 138 is extended on and between the beads 112 on both the sides along the inner sides of the tread 104, the sidewalls 108, and the clinches 110. The carcass ply 138 is turned up around each core 134 from the inner side toward the outer side in the axial direction. By this turning-up, the carcass ply 138 includes a main portion 140 and turned-up portions 142. The structure of the carcass 114 is referred to as "1-0 structure". The carcass 114 may include two or more carcass plies 138.

As is apparent from FIG. 3, an end 144 of the turned-up portion 142 is disposed near the reference position Paa. The turned-up portions 142 contribute to stiffness of the bead 112 portions of the tire 102. The structure of the carcass 114 in which the end 144 of the turned-up portion 142 is thus disposed near the reference position Paa, is referred to as a low turn-up (LTU) structure. The carcass 114 may be structured such that the end 144 of the turned-up portion 142 is disposed radially outward of the position Pba at which the tire 102 has the maximum width. The structure of the carcass 114 having such a structure is referred to as a highly turned-up (HTU) structure. In this case, in the tire 102, the turned-up portions 142 contribute mainly to stiffness in a zone from the maximum width position Pba to the core 134. The carcass 114 having the highly turned-up structure in which the length of the turned-up portion 142 is long contributes to stiffness of the tire 102. Meanwhile, the carcass 114 having the low turn-up structure in which the length of the turned-up portion 142 is short contributes to reduction in weight of the tire 102.

In FIG. 3, a double-headed arrow Hwa represents the height, in the radial direction, from the bead base line to the maximum width position Pba. A double-headed arrow Hca represents the height, in the radial direction, from the bead base line to the end 144 of the turned-up portion 142.

As described above, in the tire 102, the carcass 114 has the LTU structure. In the tire 102, a ratio of the height Hca to the height Hwa is greater than or equal to 0.2 and not greater than 0.4. When the carcass 114 has the HTU structure, the ratio of the height Hca to the height Hwa is greater than or equal to 1.1 and not greater than 1.3.

The carcass ply 138 includes multiple cords aligned with each other, and a topping rubber. An absolute value of an angle of each cord relative to the equator plane is 75° to 90°. In other words, the carcass 114 forms a radial structure. The cords are formed of an organic fiber. Preferable examples of the organic fiber include polyester fibers, nylon fibers, rayon fibers, polyethylene naphthalate fibers, and aramid fibers.

The belt 116 is disposed inward of the tread 104 in the radial direction. The belt 116 is layered over the carcass 114. The belt 116 reinforces the carcass 114. The belt 116 includes an inner layer 146 and an outer layer 148. As is apparent from FIG. 3, the width of the inner layer 146 is slightly greater than the width of the outer layer 148 in the axial direction. Each of the inner layer 146 and the outer layer 148 includes multiple cords aligned with each other, and a topping rubber, which is not shown. Each cord is tilted relative to the equator plane. An absolute value of the tilt angle is typically greater than or equal to 10° and not greater than 35°. A direction in which the cords of the inner layer 146 are tilted relative to the equator plane is opposite to a direction in which the cords of the outer layer 148 are tilted relative to the equator plane. A preferable material of the cords is steel. An organic fiber may be used for the cords. The width of the belt 116 in the axial direction is preferably greater than or equal to 0.7 times the maximum width of the tire 102. The belt 116 may include three or more layers.

The edge bands 118 are disposed radially outward of the belt 116 and near the ends, respectively, of the belt 116. Each edge band 118 includes a cord and a topping rubber, which are not shown. The cord is helically wound. The edge band 118 has a so-called jointless structure. The cord extends substantially in the circumferential direction. An angle of the cord relative to the circumferential direction is less than or equal to 5° and more preferably less than or equal to 2°. The ends of the belt 116 are held by the cords, whereby lifting of the belt 116 is inhibited. The cord is formed of an organic fiber. Preferable examples of the organic fiber include nylon fibers, polyester fibers, rayon fibers, polyethylene naphthalate fibers, and aramid fibers.

The inner liner 120 is disposed inward of the carcass 114. The inner liner 120 is joined to the inner surface of the carcass 114. The inner liner 120 is formed of a crosslinked rubber excellent in airtightness. A typical base rubber of the inner liner 120 is an isobutylene-isoprene-rubber or halogenated isobutylene-isoprene-rubber. The inner liner 120 maintains internal pressure of the tire 102.

The chafers 122 are disposed near the beads 112, respectively. When the tire 102 is mounted on the rim Ra, the chafers 122 contact with the rim Ra. By the contact, portions near the beads 112 are protected. In the present embodiment, the chafers 122 are formed of a fabric and a rubber impregnated into the fabric. The chafers 122 may be integrated with the clinches 110. In this case, the material of the chafers 122 is the same as the material of the clinches 110.

The reinforcing layers 124 are disposed outward of the carcass 114 in the axial direction. As is apparent from the drawings, the reinforcing layers 124 are layered over the carcass 114 on the axially outer sides of the carcass 114. Each reinforcing layer 124 is tapered radially outward from the radially inner side portion thereof. The reinforcing layer 124 is also referred to as a strip. The reinforcing layer 124 is also referred to as a second apex.

In the tire 102, the reinforcing layers 124 are formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the reinforcing layers 124 includes a reinforcing agent. The reinforcing agent is typically carbon black. Carbon black such as FEF, GPF, HAF, ISAF, and SAF can be used. From the viewpoint of strength of the reinforcing layers 124, an amount of the carbon black per 100 parts by weight of the base rubber is preferably greater than or equal to 5 parts by weight. From the viewpoint of flexibility of the reinforcing layers 124, the amount of the carbon black is preferably not greater than 50 parts by weight. From the viewpoint of reduction in heat generation caused by deformation, silica may be used in addition to or instead of the carbon black. In this case, dry silica and wet silica can be used.

To the rubber composition of the reinforcing layers 124, a crosslinking agent, a softener, stearic acid, zinc oxide, an antioxidant, a wax, a crosslinking activator, and the like are added as appropriate.

In FIG. 3, a double-headed arrow Laa represents the length of the apex 136. The length Laa is represented as the length from the center (reference character Pca in FIG. 3), in the axial direction, of a bottom surface 150 of the apex 136 to an outer end 152 thereof.

In the tire 102, the outer end 152 of the apex 136 is disposed inward of the reference position Paa in the radial direction. In the tire 102, the length of the apex 136 is less than the length of a conventional apex. Use of the small apex 136 allows designing of the bead 112 portion having a small thickness. The apexes 136 contribute to reduction in weight of the tire 102. Further, the small apex 136 allows the carcass ply 138 to have an appropriate contour (also referred to as a case line). Specifically, the contour of the carcass ply 138 is similar to a single arc on a cross-section perpendicular to the circumferential direction of the tire 102. The contour allows concentration of distortion to be inhibited. The small apexes 136 contribute also to improvement of durability. Further, since the carcass ply 138 has the appropriate contour, the entirety of the sidewall 108 portions is deformed in the tire 102. Deformation of the sidewall 108 portions in a specific manner is inhibited, whereby the entirety of the sidewall 108 portions contributes to stiffness of the tire 102. The contour of the carcass ply 138 contributes to steering stability of the tire 102. From this viewpoint, the length Laa of the apex 136 is preferably less than or equal to 15 mm. In the tire 102, the length Laa is preferably not less than 5 mm. The apexes 136 in which the length Laa is set to be not less than 5 mm, contribute to stiffness of the bead 112 portions. The apexes 136 allow difficult production of the tire 102 to be avoided.

In the tire 102, each reinforcing layer 124 extends radially outward from a portion near the outer end 152 of the apex 136 along the carcass 114. As is apparent from the drawings, the reinforcing layer 124 is disposed in a zone from the vicinity of the apex 136 to the maximum width position Pba. The reinforcing layers 124 contribute to in-plane torsional stiffness. The tire 102 quickly reacts to an operation of a steering wheel. The tire 102 is excellent in steering stability.

As described above, the reference position Paa corresponds to the radially outer edge of the surface on which the tire 102 and the rim Ra contact with each other. The tire 102 contacts with the rim Ra in a portion radially inward of the reference position Paa. That is, a portion, of the tire 102, which is radially inward of the reference position Paa is held by the rim Ra. Meanwhile, the tire 102 does not contact with the rim Ra in a portion radially outward of the reference position Paa. That is, a portion, of the tire 102, which is radially outward of the reference position Paa is released from the rim Ra. In the tire 102, concentration of distortion is likely to occur in the reference position Paa portion.

In the tire 102, an inner end 154 of the reinforcing layer 124 is disposed near the outer end 152 of the apex 136. As described above, the outer end 152 of the apex 136 is disposed inward of the reference position Paa in the radial direction. The reinforcing layer 124 effectively acts so as to reduce deformation of the reference position Paa portion of the tire 102. The reinforcing layers 124 contribute to further improvement of in-plane torsional stiffness. The reinforcing layers 124 also allow enhancement of stability (stability in a state close to neutral) in a state where acceleration is high as in a case where a steering wheel is turned when a speed is about 80 km/h. The tire 102 is excellent in steering stability.

In the tire 102, the small apexes 136 are used, and the positions of the reinforcing layers 124 relative to the apexes 136 are appropriately adjusted. The thickness of the bead 112 portion can be reduced, whereby the weight of the tire 102 can be reduced. Since a high in-plane torsional stiffness can be obtained, steering stability is advantageous in the tire 102 although the use of the small apexes 136 causes reduction of the lateral stiffness. According to the present invention, the pneumatic tire 102 having its weight reduced without reducing steering stability, can be obtained.

Figure 4:
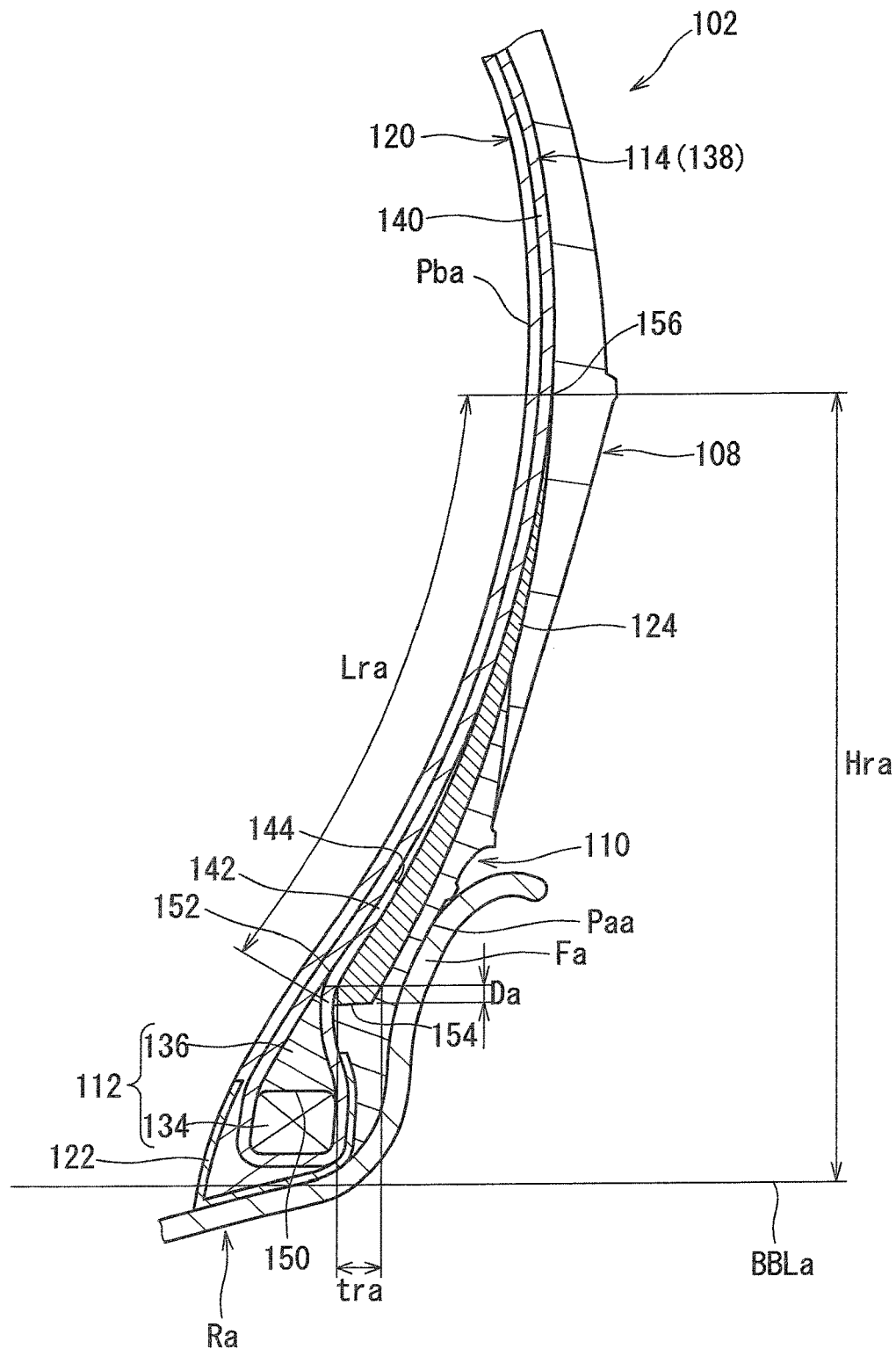
FIG. 4 is an enlarged cross-sectional view of a part of the tire shown in FIG. 3.

FIG. 4 shows a part of the tire 102 shown in FIG. 3. In FIG. 4, the up-down direction represents the radial direction of the tire 102, the left-right direction represents the axial direction of the tire 102, and the direction perpendicular to the surface of the drawing sheet represents the circumferential direction of the tire 102.

In FIG. 4, a double-headed arrow Da represents a distance, in the radial direction, from the outer end 152 of the apex 136 to the inner end 154 of the reinforcing layer 124. In the present invention, when the inner end 154 of the reinforcing layer 124 is disposed inward of the outer end 152 of the apex 136 in the radial direction, the distance Da is represented as a minus value. When the inner end 154 of the reinforcing layer 124 is disposed outward of the outer end 152 of the apex 136 in the radial direction, the distance Da is represented as a plus value.

In the tire 102, the distance Da is less than 10 mm. In other words, the inner end 154 of the reinforcing layer 124 is disposed radially inward of the position that is distant from the outer end 152 of the apex 136 by 10 mm in the radially outward direction. Thus, the inner end 154 of the reinforcing layer 124 is disposed so as to be closer to the outer end 152 of the apex 136. In the tire 102, contribution of the reinforcing layers 124 to in-plane torsional stiffness is further enhanced. The tire 102 is excellent in steering stability. From this viewpoint, the distance Da is preferably less than or equal to 5 mm and more preferably less than or equal to 3 mm.

In the tire 102, the position of the inner end 154 of the reinforcing layer 124 is more preferably equal to the outer end 152 of the apex 136 in the radial direction, or the inner end 154 of the reinforcing layer 124 is more preferably disposed radially inward of the outer end 152 of the apex 136. In other words, the distance Da is more preferably less than or equal to 0 mm. Thus, the inner end 154 of the reinforcing layer 124 is disposed so as to be much closer to the outer end 152 of the apex 136. In the tire 102, contribution of the reinforcing layers 124 to in-plane torsional stiffness is further enhanced. The tire 102 is excellent in steering stability.

In the tire 102, when the inner end 154 of the reinforcing layer 124 is disposed inward of the outer end 152 of the apex 136 in the radial direction, the position of the inner end 154 of the reinforcing layer 124 is more preferably equal, in the radial direction, to the position that is distant from the outer end 152 of the apex 136 by 10 mm in the radially inward direction, or the inner end 154 of the reinforcing layer 124 is more preferably disposed radially outward of the position that is distant from the outer end 152 of the apex 136 by 10 mm in the radially inward direction. In other words, the distance Da described above is more preferably not less than −10 mm. Thus, influence of the reinforcing layers 124 on the mass is effectively reduced. From this viewpoint, the distance Da is more preferably not less than −5 mm and particularly preferably not less than −3 mm.

In the tire 102, the specific gravity of the reinforcing layer 124 is higher than or equal to 1.18 and not higher than 1.28. The specific gravity of the clinch 110 is higher than or equal to 1.0 and not higher than 1.15. The reinforcing layer 124 has the specific gravity higher than the clinch 110. Influence of the reinforcing layers 124 on the mass of the tire 102 is greater than influence of the clinches 110 on the mass of the tire 102.

In the tire 102, the inner end 154 of the reinforcing layer 124 is more preferably disposed between the outer end 152 of the apex 136 and the bottom surface 150 thereof in the radial direction, as shown in the drawings. Thus, a portion radially inward of the inner end 154 of each reinforcing layer 124 is filled with the crosslinked rubber, of the clinch 110, which exerts less influence on the mass of the tire 102. In the tire 102, influence of the reinforcing layers 124 on the mass is effectively reduced.

The position of an outer end 156 of the reinforcing layer 124 influences movement of a buttress of the tire 102. Large movement of the buttress influences rolling resistance of the tire 102. In the tire 102, the position of the outer end 156 of the reinforcing layer 124 is preferably equal to the maximum width position Pba of the tire 102 in the radial direction, or the outer end 156 of the reinforcing layer 124 is preferably disposed radially inward of the maximum width position Pba. Thus, movement of the buttress can be effectively inhibited. In the tire 102, rolling resistance can be reduced.

In FIG. 4, a double-headed arrow Hra represents the height, in the radial direction, from the bead base line to the outer end 156 of the reinforcing layer 124.

In the tire 102, a ratio of the height Hra to the cross-sectional height Ha is preferably greater than or equal to 0.4. When the ratio is set to be greater than or equal to 0.4, the reinforcing layers 124 contribute to in-plane torsional stiffness. The tire 102 is excellent in steering stability although use of the small apexes 136 causes reduction of lateral stiffness. From this viewpoint, the ratio is more preferably greater than or equal to 0.42 and even more preferably greater than or equal to 0.45.

In FIG. 4, a double-headed arrow Lra represents the length of the reinforcing layer 124. The length Lra is represented as the length from the inner end 154 of the reinforcing layer 124 to the outer end thereof. The length Lra is measured along the inner surface of the reinforcing layer 124.

In the tire 102, the length Lra is preferably greater than or equal to 30 mm and preferably not greater than 80 mm. When the length Lra is set to be greater than or equal to 30 mm, the reinforcing layers 124 contribute to in-plane torsional stiffness. The tire 102 is excellent in steering stability. From this viewpoint, the length Lra is more preferably greater than or equal to 40 mm, even more preferably greater than or equal to 50 mm, and particularly preferably greater than or equal to 60 mm. When the length Lra is set to be not greater than 80 mm, influence of the reinforcing layers 124 on the mass and ride comfort can be reduced. From this viewpoint, the length Lra is more preferably not greater than 70 mm.

In FIG. 4, a double-headed arrow tra represents the thickness of the reinforcing layer 124. The thickness tra is measured along a straight line that extends through the outer end 152 of the apex 136 in the axial direction.

In the tire 102, the thickness tra is preferably greater than or equal to 1 mm and preferably not greater than 3 mm. When the thickness tra is set to be greater than or equal to 1 mm, the reinforcing layers 124 contribute to in-plane torsional stiffness. The tire 102 is excellent in steering stability. When the thickness tra is set to be not greater than 3 mm, influence of the reinforcing layers 124 on the mass can be reduced. The tire 102 has an appropriate mass, whereby increase of cost and rolling resistance can be reduced.

In the tire 102, as shown in FIGS. 3 and 4, the turned-up portion 142 of the carcass ply 138 is sandwiched between the main portion 140 thereof and the reinforcing layer 124. Thus, the turned-up portions 142 are held, whereby an appropriate tensile force is applied to the carcass ply 138. Since the carcass ply 138 has a high tensile force, a high cornering power is generated in the tire 102. The tire 102 is excellent in steering stability.

For the tire 102, members other than the reinforcing layers 124 need not be provided for improving in-plane torsional stiffness. In the tire 102, the number of members is less than in the tire that has members other than the reinforcing layers 124 for improving in-plane torsional stiffness. When the number of the members is reduced, the number of surfaces on which one member and another member are joined to each other is reduced, that is, the number of boundary surfaces is reduced. Since the number of the boundary surfaces is reduced, when the vehicle in a running state changes lanes, the tire 102 is more smoothly deformed. The smooth deformation leads to smooth lane change. The tire 102 is excellent in steering stability.

When the reinforcing layer 124 is formed by a plurality of members, the reinforcing layer 124 has surfaces on which one member and another member are joined to each other, that is, has boundary surfaces. The boundary surface inhibits the tire 102 from being smoothly deformed when the vehicle in a running state changes lanes. The reinforcing layer 124 having the boundary surfaces influences steering stability for lane change. From this viewpoint, each reinforcing layer 124 is preferably formed of one member. Thus, the reinforcing layer 124 having no boundary surface can be obtained. The reinforcing layers 124 contribute to smooth deformation of the tire 102 in lane change. The tire 102 is excellent in steering stability.

In the tire 102, the hardness of the reinforcing layer 124 is higher than or equal to 80 and not higher than 95. When the hardness is set to be higher than or equal to 80, the reinforcing layers 124 contribute to in-plane torsional stiffness. The tire 102 is excellent in steering stability. When the hardness is set to be not higher than 95, stiffness of the reinforcing layers 124 is appropriately maintained. The tire 102 is excellent in ride comfort.

The hardness of the reinforcing layer 124 is measured by using a type A durometer in compliance with the standard of "JIS K6253". The durometer is pressed against the cross-sectional surface shown in FIG. 3, to measure the hardness. The measurement is performed at a temperature of 23° C. The hardness of the apex 136 described below is measured in the same manner as for the hardness of the reinforcing layer 124.

In the tire 102, the hardness of the apex 136 is higher than or equal to 80 and not higher than 95. When the hardness is set to be higher than or equal to 80, the apexes 136 effectively contribute to fixing of the tire 102 to the rim Ra. The tire 102 is excellent in steering stability. When the hardness is set to be not higher than 95, stiffness of the apex 136 is appropriately maintained. The tire 102 is excellent in ride comfort.

As described above, in the tire 102, the apex 136 is formed of the crosslinked rubber. The reinforcing layer 124 is formed of the crosslinked rubber. From the viewpoint of productivity, the reinforcing layer 124 is preferably formed of a crosslinked rubber similar to the crosslinked rubber of the apex 136. In other words, the apex 136 and the reinforcing layer 124 are preferably formed by the same rubber composition being crosslinked.

In the tire 102, from the viewpoint of reducing rolling resistance, the loss tangent (tan δ) of the reinforcing layer 124 is preferably less than or equal to 0.18. Thus, heat generation in the reinforcing layers 124 is reduced. The reduction of heat generation leads to reduction in rolling resistance of the tire 102. Therefore, the tire 102 contributes to reduction in fuel consumption of the vehicle. From this viewpoint, the loss tangent is more preferably less than or equal to 0.14. The less the loss tangent is, the better the result is. Therefore, the lower limit of the loss tangent is not defined.

In the present invention, the loss tangent of the reinforcing layer 124 is measured in compliance with the standard of "JIS K 6394". The measurement conditions are as follows. The loss tangent of the apex 136 described below is also measured in the same manner as for the loss tangent of the reinforcing layer 124.

Viscoelasticity spectrometer: "VESF-3" of Iwamoto Sei-sakusho
  Initial strain: 10%
  Dynamic strain: ±1%
  Frequency: 10 Hz
  Deformation mode: tension
  Measurement temperature: 70° C.

In the tire 102, from the viewpoint of reducing rolling resistance, the loss tangent of the apex 136 is preferably less than or equal to 0.18. Thus, heat generation in the apex 136 is reduced. The reduction of heat generation leads to reduction in rolling resistance of the tire 102. Therefore, the tire 102 contributes to reduction in fuel consumption of the vehicle. From this viewpoint, the loss tangent is more preferably less than or equal to 0.14. The less the loss tangent is, the better the result is. Therefore, the lower limit of the loss tangent is not defined.

Third Embodiment

Figure 5:
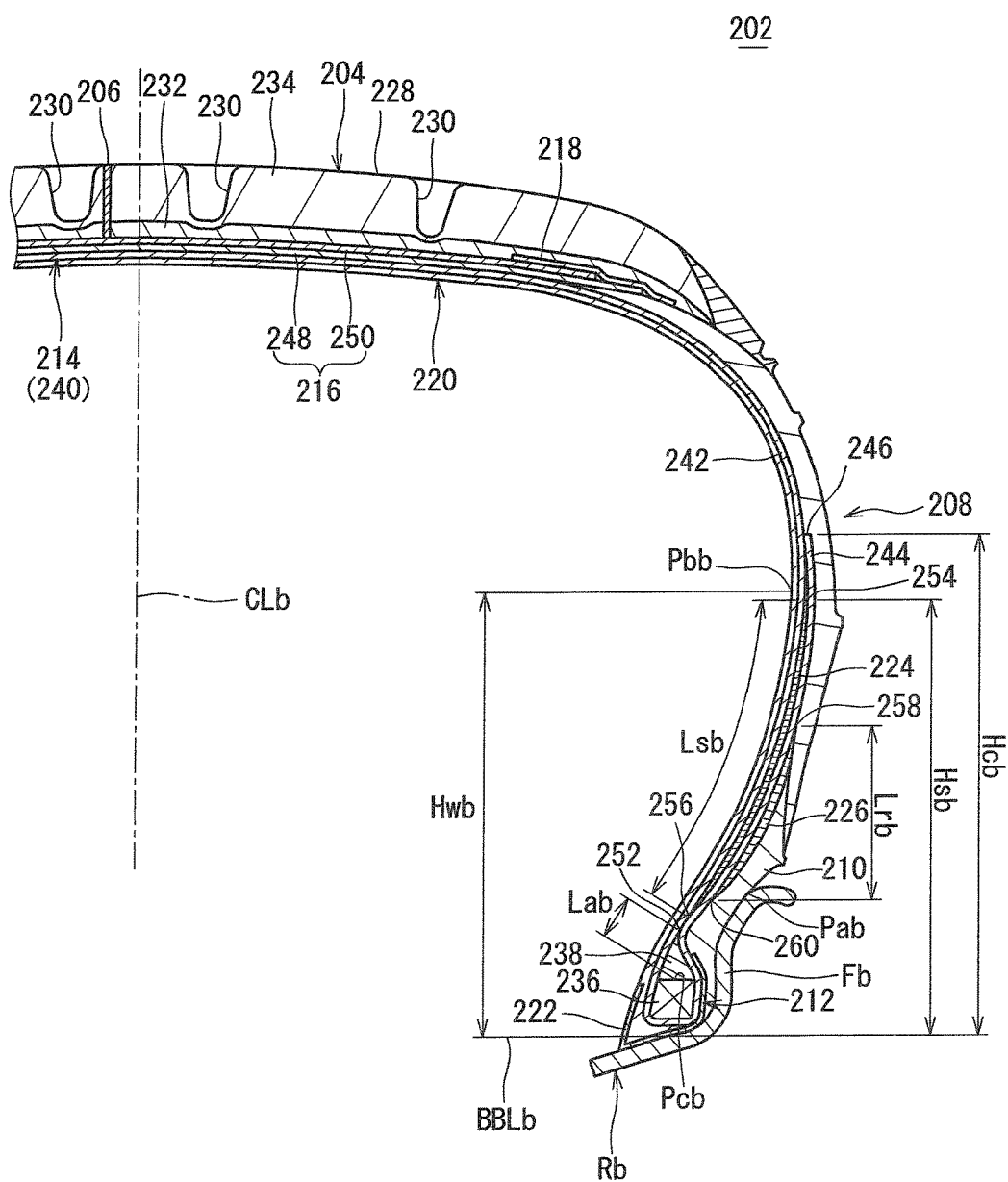
FIG. 5 is a cross-sectional view of a part of a pneumatic tire according to a third embodiment of the present invention.

FIG. 5 shows a pneumatic tire 202 according to a third embodiment. In FIG. 5, the up-down direction represents the radial direction of the tire 202, the left-right direction represents the axial direction of the tire 202, and the direction perpendicular to the surface of the drawing sheet represents the circumferential direction of the tire 202. In FIG. 5, an alternate long and short dash line CLb represents the equator plane of the tire 202. The shape of the tire 202 is symmetric with respect to the equator plane except for a tread pattern.

The tire 202 is mounted on a rim Rb. The rim Rb is a normal rim. The tire 202 is inflated with air. The internal pressure of the tire 202 is a normal internal pressure.

In the tire 202 mounted on the rim Rb, a part of the tire 202 is in contact with the rim Rb. In FIG. 5, reference character Pab represents a specific position on the outer surface of the tire 202. The position Pab corresponds to a radially outer edge of a surface on which the tire 202 and the rim Rb contact with each other when the tire 202 is mounted on the rim Rb and inflated with air to a normal internal pressure. In the present invention, the position Pab is referred to as the reference position.

The tire 202 includes a tread 204, a penetration portion 206, a pair of sidewalls 208, a pair of clinches 210, a pair of beads 212, a carcass 214, a belt 216, a pair of edge bands 218, an inner liner 220, a pair of chafers 222, a pair of strips 224, and a pair of support layers 226. The tire 202 is of a tubeless type. The tire 202 is mounted to passenger cars.

In FIG. 5, reference character Pbb represents a specific position on the inner surface of the tire 202. At the position Pbb, the tire 202 has the axially maximum width represented on the profile of the inner surface. In the tire 202, the length, in the axial direction, between the left and right side surfaces (outer surfaces of the sidewalls 208) at the position Pbb is represented as the maximum width (also referred to as a cross-sectional width) of the tire 202. In the present invention, the position Pbb is a position at which the tire 202 has the maximum width.

The tread 204 has a shape that projects radially outward. The tread 204 forms a tread surface 228 that can contact with a road surface. The tread 204 has grooves 230 formed therein. A tread pattern is formed by the grooves 230. The tread 204 includes a base layer 232 and a cap layer 234. The cap layer 234 is disposed outward of the base layer 232 in the radial direction. The cap layer 234 is layered over the base layer 232. The base layer 232 is formed of a crosslinked rubber excellent in adhesiveness. A typical base rubber of the base layer 232 is natural rubber. The cap layer 234 is formed of a crosslinked rubber excellent in wear resistance, heat resistance, and grip performance.

The penetration portion 206 penetrates through the tread 204. One end of the penetration portion 206 is exposed on the tread surface 228. The other end of the penetration portion 206 contacts with the belt 216. The penetration portion 206 extends in the circumferential direction. In other words, the penetration portion 206 is annular. The tire 202 may include a plurality of the penetration portions 206 which do not form an annular shape and are spaced from each other in the circumferential direction. The penetration portion 206 is formed of a conductive crosslinked rubber.

The sidewalls 208 extend almost inward from the ends, respectively, of the tread 204 in the radial direction. The radially outer side portions of the sidewalls 208 are joined to the tread 204. The radially inner side portions of the sidewalls 208 are joined to the clinches 210. The sidewalls 208 are formed of a crosslinked rubber excellent in cut resistance and weather resistance. The sidewalls 208 prevent damage to the carcass 214.

The clinches 210 extend almost inward from the ends of the sidewalls 208, respectively, in the radial direction. The clinches 210 are disposed outward of the beads 212 and the carcass 214 in the axial direction. The clinches 210 are formed of a crosslinked rubber excellent in wear resistance. The clinch 210 contacts with a flange Fb of the rim Rb.

The beads 212 are disposed inward of the clinches 210, respectively, in the axial direction. The clinches 210 extend almost inward from the ends of the sidewalls 208 in the radial direction. Therefore, the beads 212 are disposed inward of the sidewalls 208 in the radial direction. Each bead 212 includes a core 236 and an apex 238. The core 236 is ring-shaped, and includes a non-stretchable wound wire. A typical material of the wire is steel. The apex 238 is disposed outward of the core 236 in the radial direction. The apex 238 extends outward from the core 236 in the radial direction. The apex 238 is tapered radially outward. The apex 238 is formed of a highly hard crosslinked rubber. The apex 238 is also referred to as a first apex.

In the tire 202, the apex 238 is formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the apex 238 includes a reinforcing agent. The reinforcing agent is typically carbon black. Carbon black such as FEF, GPF, HAF, ISAF, and SAF can be used. From the viewpoint of strength of the apex 238, an amount of the carbon black per 100 parts by weight of the base rubber is preferably greater than or equal to 5 parts by weight. From the viewpoint of flexibility of the apex 238, the amount of the carbon black is preferably not greater than 50 parts by weight. From the viewpoint of reduction in heat generation caused by deformation, silica may be used in addition to or instead of the carbon black. In this case, dry silica and wet silica can be used.

To the rubber composition of the apex 238, a crosslinking agent, a softener, stearic acid, zinc oxide, an antioxidant, a wax, a crosslinking activator, and the like are added as appropriate.

The carcass 214 includes one carcass ply 240. The carcass ply 240 is extended on and between the beads 212 on both the sides along the inner sides of the tread 204, the sidewalls 208, and the clinches 210. The carcass ply 240 is turned up around each core 236 from the inner side toward the outer side in the axial direction. By this turning-up, the carcass ply 240 includes a main portion 242 and turned-up portions 244. The structure of the carcass 214 is referred to as "1-0 structure". The carcass 214 may include two or more carcass plies 240.

As is apparent from FIG. 5, an end 246 of the turned-up portion 244 is disposed radially outward of the maximum width position Pbb of the tire 202. The turned-up portion 244 contributes mainly to stiffness in a zone from the maximum width position Pbb to the core 236 in the tire 202. The structure of the carcass 214 in which the end 246 of the turned-up portion 244 is thus disposed radially outward of the maximum width position Pbb is also referred to as a highly turned-up (HTU) structure. The carcass 214 may be structured such that the end 246 of the turned-up portion 244 is disposed near the reference position Pab described above. The structure of the carcass 214 having such a structure is referred to as a low turn-up (LTU) structure. In this case, influence of the carcass 214 on the mass is reduced. The low turn-up (LTU) structure contributes to reduction in weight of the tire 202.

In FIG. 5, a solid line BBLb represents the bead base line. The bead base line is a line that defines the rim diameter (see JATMA) of the rim Rb on which the tire 202 is mounted. The bead base line extends in the axial direction. A double-headed arrow Hwb represents the height, in the radial direction, from the bead base line to the maximum width position Pbb. A double-headed arrow Hcb represents the height, in the radial direction, from the bead base line to the end 246 of the turned-up portion 244.

In the tire 202, when the carcass 214 has the HTU structure, a ratio of the height Hcb to the height Hwb is greater than or equal to 1.1 and not greater than 1.3. When the carcass 214 has the LTU structure, the ratio is greater than or equal to 0.2 and not greater than 0.4.

The carcass ply 240 includes multiple cords aligned with each other, and a topping rubber. An absolute value of an angle of each cord relative to the equator plane is 75° to 90°. In other words, the carcass 214 forms a radial structure. The cords are formed of an organic fiber. Preferable examples of the organic fiber include polyester fibers, nylon fibers, rayon fibers, polyethylene naphthalate fibers, and aramid fibers.

The belt 216 is disposed inward of the tread 204 in the radial direction. The belt 216 is layered over the carcass 214. The belt 216 reinforces the carcass 214. The belt 216 includes an inner layer 248 and an outer layer 250. As is apparent from FIG. 5, the width of the inner layer 248 is slightly greater than the width of the outer layer 250 in the axial direction. Each of the inner layer 248 and the outer layer 250 includes multiple cords aligned with each other, and a topping rubber, which is not shown. Each cord is tilted relative to the equator plane. The absolute value of the tilt angle is typically greater than or equal to 10° and not greater than 35°. A direction in which the cords of the inner layer 248 are tilted relative to the equator plane is opposite to a direction in which the cords of the outer layer 250 are tilted relative to the equator plane. A preferable material of the cords is steel. An organic fiber may be used for the cords. The width, in the axial direction, of the belt 216 is preferably greater than or equal to 0.7 times the maximum width of the tire 202. The belt 216 may include three or more layers.

The edge bands 218 are disposed radially outward of the belt 216 and near the ends, respectively, of the belt 216. Each edge band 218 includes a cord and a topping rubber, which are not shown. The cord is helically wound. The edge band 218 has a so-called jointless structure. The cord extends substantially in the circumferential direction. An angle of the cord relative to the circumferential direction is less than or equal to 5° and more preferably less than or equal to 2°. The ends of the belt 216 are held by the cords, whereby lifting of the belt 216 is inhibited. The cord is formed of an organic fiber. Preferable examples of the organic fiber include nylon fibers, polyester fibers, rayon fibers, polyethylene naphthalate fibers, and aramid fibers.

The inner liner 220 is disposed inward of the carcass 214. The inner liner 220 is joined to the inner surface of the carcass 214. The inner liner 220 is formed of a crosslinked rubber excellent in airtightness. A typical base rubber of the inner liner 220 is an isobutylene-isoprene-rubber or halogenated isobutylene-isoprene-rubber. The inner liner 220 maintains internal pressure of the tire 202.

The chafers 222 are disposed near the beads 212, respectively. When the tire 202 is mounted on the rim Rb, the chafers 222 contact with the rim Rb. By the contact, portions near the beads 212 are protected. In the present embodiment, the chafers 222 are formed of a fabric and a rubber impregnated into the fabric. The chafers 222 may be integrated with the clinches 210. In this case, the material of the chafers 222 is the same as the material of the clinches 210.

The strips 224 are disposed outward of the apexes 238, respectively, in the radial direction. As is apparent from the drawings, the strips 224 are disposed outward of the main portion 242 in the axial direction. The strips 224 are disposed inward of the turned-up portions 244 of the carcass ply 240 in the axial direction. In the tire 202, the strips 224 are disposed between the main portion 242 and the turned-up portions 244, respectively. In other words, the strips 224 are sandwiched between the main portion 242 and the turned-up portions 244, respectively.

In the tire 202, the strips 224 are formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the strips 224 includes a reinforcing agent. The reinforcing agent is typically carbon black. Carbon black such as FEF, GPF, HAF, ISAF, and SAF can be used. From the viewpoint of strength of the strips 224, an amount of the carbon black per 100 parts by weight of the base rubber is preferably greater than or equal to 5 parts by weight. From the viewpoint of flexibility of the strips 224, the amount of the carbon black is preferably not greater than 50 parts by weight. From the viewpoint of reduction in heat generation caused by deformation, silica may be used in addition to or instead of the carbon black. In this case, dry silica and wet silica can be used.

To the rubber composition of the strips 224, a crosslinking agent, a softener, stearic acid, zinc oxide, an antioxidant, a wax, a crosslinking activator, and the like are added as appropriate.

The support layers 226 are disposed outward of the strips 224, respectively, in the axial direction. As described above, in the tire 202, the carcass 214 has the highly turned-up structure, and the strips 224 are disposed inward of the turned-up portions 244 in the axial direction. As is apparent from the drawings, in the tire 202, the support layers 226 are layered over the turned-up portions 244 on the axially outer sides of the turned-up portions 244. The support layers 226 extend along the turned-up portions 244 in the radial direction. When the carcass 214 has the low turn-up structure described above, the end 246 of each turned-up portion 244 is disposed near the reference position Pab. Therefore, in this case, the support layers 226 are layered over the strips 224 on the axially outer sides of the strips 224. In this case, the support layers 226 extend along the strips 224 in the radial direction. The support layer 226 is also referred to as a second apex.

In the tire 202, the support layers 226 are formed by a rubber composition being crosslinked. A preferable base rubber of the rubber composition is a diene rubber. Specific examples of the diene rubber include natural rubbers (NR), polyisoprenes (IR), polybutadienes (BR), acrylonitrile-butadiene copolymers (NBR), and polychloroprenes (CR). Two or more types of the rubbers may be used in combination.

The rubber composition of the support layers 226 includes a reinforcing agent. The reinforcing agent is typically carbon black. Carbon black such as FEF, GPF, HAF, ISAF, and SAF can be used. From the viewpoint of strength of the support layers 226, an amount of the carbon black per 100 parts by weight of the base rubber is preferably greater than or equal to 5 parts by weight. From the viewpoint of flexibility of the support layers 226, the amount of the carbon black is preferably not greater than 50 parts by weight. From the viewpoint of reduction in heat generation caused by deformation, silica may be used in addition to or instead of the carbon black. In this case, dry silica and wet silica can be used.

To the rubber composition of the support layers 226, a crosslinking agent, a softener, stearic acid, zinc oxide, an antioxidant, a wax, a crosslinking activator, and the like are added as appropriate.

In FIG. 5, a double-headed arrow Lab represents the length of the apex 238. The length Lab is represented as the length from the center (reference character Pcb in FIG. 5), in the axial direction, of the bottom surface of the apex 238 to an outer end 252 thereof.

In the tire 202, the outer end 252 of the apex 238 is disposed radially inward of the reference position Pab described above. In the tire 202, the length of the apex 238 is less than the length of a conventional apex. Use of the small apex 238 allows designing of the bead 212 portion having a small thickness. The apexes 238 contribute to reduction in weight of the tire 202. Further, the small apex 238 allows the carcass ply 240 to have an appropriate contour (also referred to as a case line). Specifically, the contour of the carcass ply 240 is similar to a single arc on a cross-section perpendicular to the circumferential direction of the tire 202. The contour allows concentration of distortion to be reduced. The small apexes 238 contribute also to improvement of durability. Further, since the carcass ply 240 has the appropriate contour, the entirety of the sidewall 208 portions is deformed in the tire 202. Deformation of the sidewall 208 portions in a specific manner is inhibited, whereby the entirety of the sidewall 208 portions contributes to stiffness of the tire 202. The contour of the carcass ply 240 contributes to steering stability of the tire 202. From this viewpoint, the length Lab of the apex 238 is preferably less than or equal to 15 mm. In the tire 202, the length Lab is preferably not less than 5 mm. The apex 238 in which the length Lab is set to be not less than 5 mm, contributes to stiffness of the bead 212 portions. The apex 238 having an appropriate size allows difficult production of the tire 202 to be avoided.

In the tire 202, each strip 224 extends along the main portion 242 of the carcass ply 240 in the radial direction at a portion radially outward of the apex 238. As is apparent from the drawings, each strip 224 is disposed in a zone from the vicinity of the apex 238 to the maximum width position Pbb. The strips 224 contribute to in-plane torsional stiffness. In the tire 202, although the use of the small apex 238 causes reduction in lateral stiffness, reaction to an operation of a steering wheel is quick. The tire 202 is excellent in steering stability.

The position of an outer end 254 of the strip 224 influences movement of a buttress of the tire 202. Large movement of the buttress influences rolling resistance of the tire 202. In the tire 202, the position of the outer end 254 of the strip 224 is preferably equal to the maximum width position Pbb of the tire 202 in the radial direction, or the outer end 254 of the strip 224 is preferably disposed radially inward of the maximum width position Pbb. Thus, movement of the buttress can be effectively reduced. In the tire 202, rolling resistance can be reduced. In the present invention, the position of the outer end 254 of the strip 224 is defined as being equal to the maximum width position Pbb of the tire 202 when a distance between the outer end 254 of the strip 224 and the maximum width position Pbb of the tire 202 is less than or equal to 1 mm.

In FIG. 5, a double-headed arrow Lsb represents the length of the strip 224. The length Lsb is represented as the length from an inner end 256 of the strip 224 to the outer end 254 thereof. The length Lsb is measured along the strip 224. A double-headed arrow Hsb represents the height, in the radial direction, from the bead base line to the outer end 254 of the strip 224.

In the tire 202, the length Lsb is preferably greater than or equal to 30 mm and preferably not greater than 70 mm. When the length Lsb is set to be greater than or equal to 30 mm, the strips 224 contribute to in-plane torsional stiffness. The tire 202 is excellent in steering stability. From this viewpoint, the length Lsb is preferably greater than or equal to 40 mm. When the length Lsb is set to be not greater than 70 mm, influence of the strips 224 on the mass and ride comfort is reduced. From this viewpoint, the length Lsb is preferably not greater than 60 mm.

In the tire 202, a ratio of the height Hsb to the height Hwb described above is preferably greater than or equal to 0.5. Thus, the strips 224 contribute to in-plane torsional stiffness. The tire 202 is excellent in steering stability. From this viewpoint, the ratio is more preferably greater than or equal to 0.6. As described above, from the viewpoint of rolling resistance, the position of the outer end 254 of the strip 224 is preferably equal to the maximum width position Pbb of the tire 202 in radial direction, or the outer end 254 of the strip 224 is preferably disposed radially inward of the maximum width position Pbb of the tire 202. Therefore, the ratio is preferably not greater than 1.

The tire 202 contacts with the rim Rb in a portion radially inward of the reference position Pab. That is, a portion, of the tire 202, radially inward of the reference position Pab is held by the rim Rb. Meanwhile, the tire 202 does not contact with the rim Rb in a portion radially outward of the reference position Pab. That is, a portion, of the tire 202, radially outward of the reference position Pab is released from the rim Rb. In the tire 202, concentration of distortion is likely to occur in the reference position Pab portion.

In the tire 202, the support layer 226 extends almost outward from the vicinity of the reference position Pab in the radial direction at a portion axially outward of the strip 224. An outer end 258 of the support layer 226 is disposed outward of the reference position Pab in the radial direction. The support layer 226 acts so as to inhibit deformation of the reference position Pab portion of the tire 202. The support layers 226 contribute to in-plane torsional stiffness. The support layers 226 also allow enhancement of stability (stability in a state close to neutral) in a state where acceleration is high as in a case where a steering wheel is turned when a speed is about 80 km/h. The support layers 226 contribute to further improvement of steering stability.

As described above, in the tire 202, the small apexes 238 contribute to reduction in weight of the tire 202. The strips 224 and the support layers 226 allow improvement of in-plane torsional stiffness, whereby steering stability is advantageous. According to the present invention, the pneumatic tire 202 having steering stability improved while inhibiting increase of the mass, is obtained.

In FIG. 5, a double-headed arrow Lrb represents the length, in the radial direction, from an inner end 260 of the support layer 226 to the outer end 258 thereof. In the present invention, the length Lrb is the length of the support layer 226.

In the tire 202, the length Lrb is preferably greater than or equal to 10 mm and preferably not greater than 50 mm. When the length Lrb is set to be greater than or equal to 10 mm, the support layers 226 contribute to in-plane torsional stiffness. The tire 202 is excellent in steering stability. From this viewpoint, the length Lrb is preferably greater than or equal to 20 mm. When the length Lrb is set to be not greater than 50 mm, influence of the support layers 226 on the mass and ride comfort is reduced. From this viewpoint, the length Lrb is preferably not greater than 40 mm.

Figure 6:
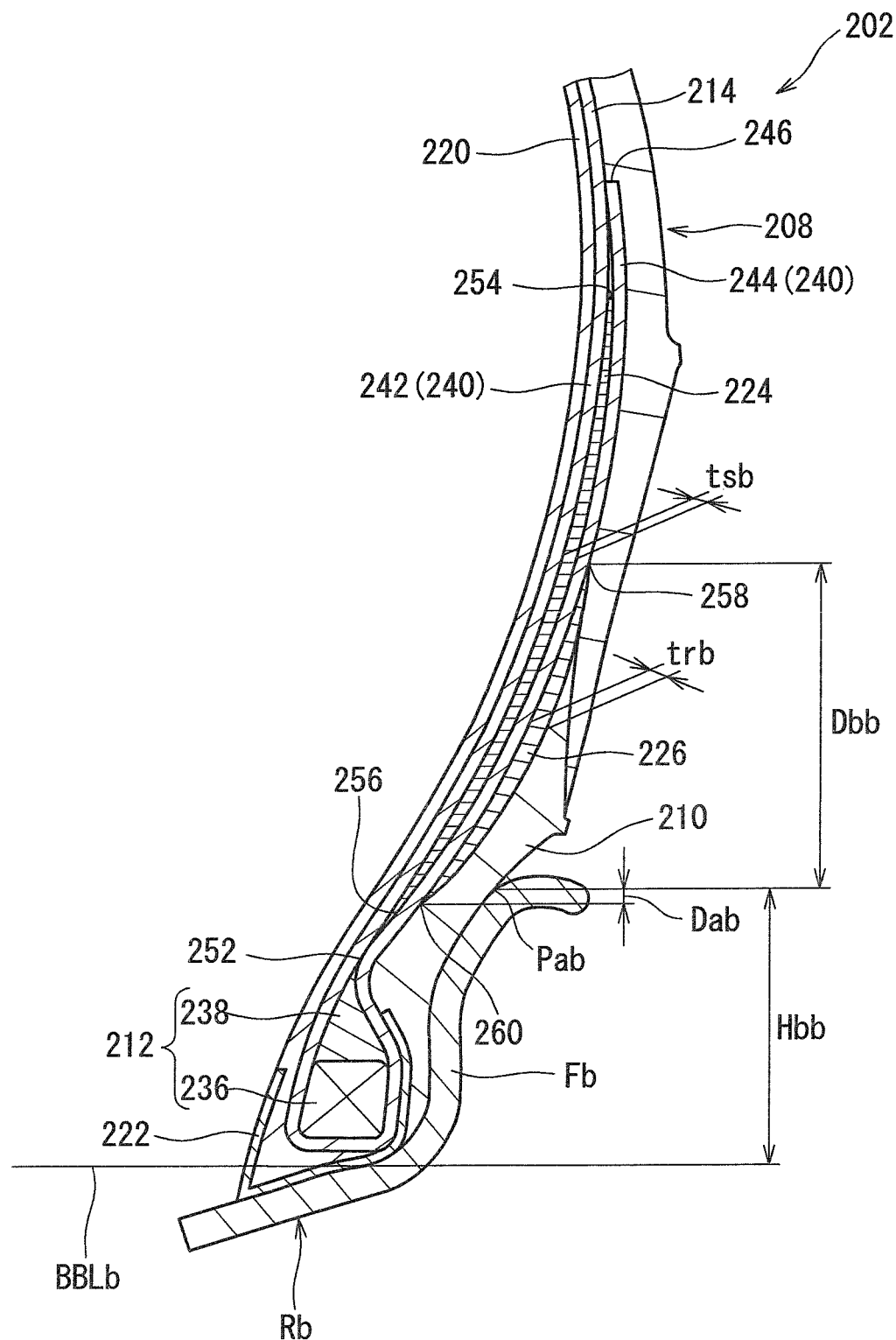
FIG. 6 is an enlarged cross-sectional view of a part of the tire shown in FIG. 5.

FIG. 6 shows a part of the tire 202 shown in FIG. 5. In FIG. 6, the up-down direction represents the radial direction of the tire 202, the left-right direction represents the axial direction of the tire 202, and the direction perpendicular to the surface of the drawing sheet represents the circumferential direction of the tire 202. In FIG. 6, a double-headed arrow Hbb represents the height, in the radial direction, from the bead base line (solid line BBLb in FIG. 6) to the reference position Pab. The height Hbb typically ranges from 20 mm to 25 mm.

In FIG. 6, a double-headed arrow Dab represents the distance, in the radial direction, from the reference position Pab to the inner end 260 of the support layer 226. In the present invention, when the inner end 260 of the support layer 226 is disposed inward of the reference position Pab in the radial direction, the distance Dab is represented as a minus value. When the inner end 260 of the support layer 226 is disposed outward of the reference position Pab in the radial direction, the distance Dab is represented as a plus value.

In the tire 202, the distance Dab is preferably less than or equal to 10 mm. Thus, the inner end 260 of the support layer 226 is disposed so as to be closer to the reference position Pab. In the tire 202, contribution of the support layers 226 to in-plane torsional stiffness is further enhanced. The tire 202 is excellent in steering stability.

In the tire 202, the position of the inner end 260 of the support layer 226 is more preferably equal to the reference position Pab in the radial direction, or the inner end 260 of the support layer 226 is more preferably disposed radially inward of the reference position Pab. In other words, the distance Dab is more preferably less than or equal to 0 mm. Thus, the support layer 226 effectively acts so as to reduce deformation of the reference position Pab portion of the tire 202. In the tire 202, steering stability is further improved. From the viewpoint of influence of the support layers 226 on the mass, the distance Dab is preferably not less than −10 mm. In the present invention, the position of the inner end 260 of the support layer 226 is defined as being equal to the reference position Pab when a distance between the inner end 260 of the support layer 226 and the reference position Pab is less than or equal to 1 mm.

As described above, from the viewpoint of steering stability, the distance Dab is preferably less than or equal to 10 mm, and more preferably less than or equal to 0 mm. From the viewpoint of reduction in weight, the distance Dab is preferably not less than −10 mm. That is, in the tire 202, from the viewpoint of steering stability and reduction in weight, the support layers 226 are preferably disposed such that the inner end 260 of each support layer 226 is disposed in a zone from a position distant from the reference position Pab by 10 mm in the radially inward direction, to a position distant from the reference position Pab by 10 mm in the radially outward direction. From the viewpoint of further improvement of steering stability, the support layers 226 are more preferably disposed such that the inner end 260 of each support layer 226 is disposed in a zone from a position distant from the reference position Pab by 10 mm in the radially inward direction to the reference position Pab.

In FIG. 6, a double-headed arrow Dbb represents the distance, in the radial direction, from the reference position Pab to the outer end 258 of the support layer 226.

In the tire 202, the distance Dbb is preferably greater than or equal to 10 mm and preferably not greater than 40 mm. In other words, the support layers 226 are preferably disposed such that the outer end 258 of each support layer 226 is disposed in a zone from a position distant from the reference position Pab by 10 mm in the radially outward direction, to a position distant from the reference position Pab by 40 mm in the radially outward direction. When the distance Dbb is set to be greater than or equal to 10 mm, the support layers 226 effectively contribute to in-plane torsional stiffness. The tire 202 is excellent in steering stability. When the distance Dbb is set to be not greater than 40 mm, influence of the support layers 226 on the mass is reduced. Influence on stiffness is also reduced, whereby excellent ride comfort is maintained in the tire 202.

In FIG. 6, a double-headed arrow tsb represents the thickness of the strip 224. A double-headed arrow trb represents the thickness of the support layer 226. The thickness tsb and the thickness trb are each represented as the maximum thickness.

In the tire 202, the thickness tsb is preferably greater than or equal to 0.5 mm and preferably not greater than 2 mm. When the thickness tsb is set to be greater than or equal to 0.5 mm, the strips 224 contribute to in-plane torsional stiffness. The tire 202 is excellent in steering stability. When the thickness tsb is set to be not greater than 2 mm, influence of the strips 224 on the mass is reduced. Since the tire 202 has an appropriate mass, increase of cost and rolling resistance can be reduced.

In the tire 202, the thickness trb is preferably greater than or equal to 1 mm and preferably not greater than 2 mm. When the thickness trb is set to be greater than or equal to 1 mm, the support layers 226 contribute to in-plane torsional stiffness. The tire 202 is excellent in steering stability. When the thickness trb is set to be not greater than 2 mm, influence of the support layers 226 on the mass is reduced. Since the tire 202 has an appropriate mass, increase of cost and rolling resistance can be reduced.

In the tire 202, as shown in FIGS. 5 and 6, the turned-up portions 244 of the carcass ply 240 are preferably sandwiched between the strips 224 and the support layers 226, respectively. Thus, the turned-up portions 244 are held, whereby an appropriate tensile force is applied to the carcass ply 240. Since the carcass ply 240 has a high tensile force, a high cornering power is generated in the tire 202. The tire 202 is excellent in steering stability. When the carcass 214 has the LTU structure in the tire 202, the ends 246 of the turned-up portions 244 may be sandwiched between the strips 224 and the support layers 226, respectively. Thus, the same effect can be obtained.

When the tire 202 is deformed, an inner side portion of the sidewall 208 portion of the tire 202 is compressed, and an outer side portion thereof is drawn and extended. In the tire 202, the strips 224 are disposed inward of the turned-up portions 244 in the axial direction. Therefore, the turned-up portions 244 are disposed in axially outer portions as compared to turned-up portions of a conventional tire which does not have the strips 224. In the tire 202, tensile force higher than tensile force generated in the turned-up portions of the conventional tire is generated in the turned-up portions 244. The turned-up portions 244 having the high tensile force generated therein contribute to stiffness of the tire 202. The tire 202 is excellent in steering stability.

In the tire 202, the hardness of the support layer 226 is preferably higher than or equal to 80 and preferably not higher than 95. When the hardness is set to be higher than or equal to 80, the support layers 226 contribute to in-plane torsional stiffness. The tire 202 is excellent in steering stability. When the hardness is set to be not higher than 95, stiffness of the support layers 226 is appropriately maintained. The tire 202 is excellent in ride comfort.

The hardness of the support layer 226 is measured by a type A durometer in compliance with the standard of "JIS K6253". The durometer is pressed against the cross-sectional surface shown in FIG. 5 to measure the hardness. The measurement is performed at a temperature of 23° C. The hardness of each of the strips 224 and the apexes 238 described below is also measured in the same manner as for the hardness of the support layers 226.

In the tire 202, the hardness of the strip 224 is preferably higher than or equal to 80 and preferably not higher than 95. When the hardness is set to be higher than or equal to 80, the strips 224 contribute to in-plane torsional stiffness. The tire 202 is excellent in steering stability. When the hardness is set to be not higher than 95, stiffness of the strips 224 is appropriately maintained. The tire 202 is excellent in ride comfort.

In the tire 202, the hardness of the apex 238 is preferably higher than or equal to 80 and preferably not higher than 95. When the hardness is set to be higher than or equal to 80, the apexes 238 effectively contribute to fixing of the tire 202 to the rim Rb. The tire 202 is excellent in steering stability. When the hardness is set to be not higher than 95, stiffness of the apexes 238 is appropriately maintained. The tire 202 is excellent in ride comfort.

As described above, in the tire 202, the apex 238 is formed of the crosslinked rubber. The strip 224 is formed of the crosslinked rubber. The support layer 226 is formed of the crosslinked rubber. From the viewpoint of productivity, the strip 224 is preferably formed of a crosslinked rubber similar to the crosslinked rubber of the apex 238. From the same viewpoint, the support layer 226 is preferably formed of a crosslinked rubber similar to the crosslinked rubber of the apex 238. Particularly preferably, the strips 224 and the support layers 226 are each formed of a crosslinked rubber similar to the crosslinked rubber of the apexes 238, that is, the apexes 238, the strips 224, and the support layers 226 are formed by the same rubber composition being crosslinked.

In the tire 202, from the viewpoint of reducing rolling resistance, the loss tangent (tan δ) of the support layer 226 is preferably less than or equal to 0.18. Thus, heat generation in the support layers 226 is reduced. The reduction of heat generation leads to reduction in rolling resistance of the tire 202. Therefore, the tire 202 contributes to reduction in fuel consumption of the vehicle. From this viewpoint, the loss tangent is more preferably less than or equal to 0.14. The less the loss tangent is, the better the result is. Therefore, the lower limit of the loss tangent is not defined.

In the present invention, the loss tangent of the support layer 226 is measured in compliance with the standard of "JIS K 6394". The measurement conditions are as follows. The loss tangent of each of the strips 224 and the apexes 238 described below is also measured in the same manner as for the loss tangent of the support layers 226.

Viscoelasticity spectrometer: "VESF-3" of Iwamoto Seisakusho
Initial strain: 10%
Dynamic strain: ±1%
Frequency: 10 Hz
Deformation mode: tension
Measurement temperature: 70° C.

In the tire 202, from the viewpoint of reducing rolling resistance, the loss tangent of the strip 224 is preferably less than or equal to 0.18. Thus, heat generation in the strips 224 is reduced. The reduction of heat generation leads to reduction in rolling resistance of the tire 202. Therefore, the tire 202 contributes to reduction in fuel consumption of the vehicle. From this viewpoint, the loss tangent is more preferably less than or equal to 0.14. The less the loss tangent is, the better the result is. Therefore, the lower limit of the loss tangent is not defined.

In the tire 202, from the viewpoint of reducing rolling resistance, the loss tangent of the apex 238 is preferably less than or equal to 0.18. Thus, heat generation in the apexes 238 is reduced. Reduction in heat generation leads to reduction in rolling resistance of the tire 202. Therefore, the tire 202 contributes to reduction in fuel consumption of the vehicle. From this viewpoint, the loss tangent is more preferably less than or equal to 0.14. The less the loss tangent is, the better the result is. Therefore, the lower limit of the loss tangent is not defined.

Preferred embodiments of the present invention have features as described below in sub-paragraphs [1] to [19].

[1] A pneumatic tire including: a tread having an outer surface that forms a tread surface; a pair of sidewalls that extend almost inward from ends, respectively, of the tread in a radial direction; a pair of clinches that extend almost inward from ends of the sidewalls, respectively, in the radial direction; a pair of beads disposed inward of the clinches, respectively, in an axial direction; a carcass extended on and between one of the beads and the other of the beads along inner sides of the tread and the sidewalls; and a pair of strips that extend almost outward from the beads, respectively, along the carcass in the radial direction, in which the beads include: cores; first apexes that extend outward from the cores in the radial direction; and second apexes disposed outward of the first apexes in the axial direction, the carcass includes a carcass ply, the carcass ply is turned up around the cores from an inner side toward an outer side in the axial direction, and the carcass ply includes a main portion and turned-up portions by the carcass ply being turned up, the turned-up portions are disposed between the first apexes and the second apexes, and the turned-up portions contact with the main portion in portions radially outward of outer ends of the first apexes, outer ends of the second apexes are disposed outward of ends of the turned-up portions in the radial direction, a position of an outer end of each strip is equal, in the radial direction, to a position at which the tire has a maximum width, or the outer end of each strip is disposed radially inward of the position at which the tire has the maximum width, and a complex elastic modulus of each strip is higher than or equal to 60 MPa and not higher than 70 MPa.

[2] The pneumatic tire according to [1] described above, in which a length of each first apex is greater than or equal to 5 mm and not greater than 15 mm.

[3] The pneumatic tire according to [1] or [2] described above, in which a length from the outer end of each first apex to the end of a corresponding one of the turned-up portions is greater than or equal to 10 mm.

[4] The pneumatic tire according to any one of [1] to [3] described above, including a pair of chafers that are turned up around the beads, respectively, from the inner side toward the outer side in the axial direction, in which, one end of each chafer is disposed between a corresponding one of the turned-up portions and a corresponding one of the clinches in the axial direction, a height from a bead base line to the one end of each chafer is greater than or equal to 5 mm and not greater than 22 mm, and the chafers contact with a rim when the tire is mounted on the rim.

[5] The pneumatic tire according to any one of [1] to [4] described above, in which the strips extend outward from the outer ends of the second apexes along the main portion in the radial direction.

[6] A pneumatic tire including: a tread; a pair of sidewalls; a pair of beads; a carcass; and a pair of reinforcing layers, in which the sidewalls extend almost inward from ends, respectively, of the tread in a radial direction, the beads are disposed inward of the sidewalls, respectively, in the radial direction, the carcass is extended on and between one of the beads and the other of the beads along inner sides of the tread and the sidewalls, the reinforcing layers are disposed outward of the carcass in an axial direction, the beads include cores, and apexes that extend outward from the cores, respectively, in the radial direction, the reinforcing layers extend outward from portions near outer ends of the apexes along the carcass in the radial direction, and each reinforcing layer is tapered outward from an inner portion thereof in the radial direction, when a reference position is defined as a position on an outer surface of the tire, the position corresponding to a radially outer edge of a contact surface on which the tire and a rim contact with each other when the tire is mounted on the rim and inflated with air to a normal internal pressure, each of the outer ends of the apexes is disposed inward of the reference position in the radial direction, and an inner end of each reinforcing layer is disposed inward of a position that is distant from the outer end of a corresponding one of the apexes by 10 mm in a radially outward direction.

[7] The pneumatic tire according to [6] described above, in which a position of an outer end of each reinforcing layer is equal, in the radial direction, to a position at which the tire has a maximum width, or the outer end of each reinforcing layer is disposed radially inward of the position at which the tire has the maximum width.

[8] The pneumatic tire according to [6] or [7] described above, in which a ratio of a height, in the radial direction, from a bead base line to the outer end of each reinforcing layer, relative to a cross-sectional height of the tire, is greater than or equal to 0.4.

[9] The pneumatic tire according to any one of [6] to [8] described above, in which a position of the inner end of each reinforcing layer is equal, in the radial direction, to the outer end of a corresponding one of the apexes, or the inner end of each reinforcing layer is disposed radially inward of the outer end of a corresponding one of the apexes.

[10] The pneumatic tire according to [9] described above, in which, when the inner end of each reinforcing layer is disposed radially inward of the outer end of a corresponding one of the apexes, a position of the inner end of each reinforcing layer is equal, in the radial direction, to a position that is distant from the outer end of the apex by 10 mm in a radially inward direction, or the inner end of the reinforcing layer is disposed radially outward of the position that is distant from the outer end of the apex by 10 mm in the radially inward direction.

[11] The pneumatic tire according to any one of [6] to [10] described above, in which a thickness of each reinforcing layer is greater than or equal to 1 mm and not greater than 3 mm.

[12] The pneumatic tire according to any one of [6] to [11] described above, in which a length of each reinforcing layer is greater than or equal to 60 mm and not greater than 80 mm.

[13] A pneumatic tire including: a tread; a pair of sidewalls; a pair of clinches; a pair of beads; a carcass; a pair of strips; and a pair of support layers, in which the sidewalls extend almost inward from ends, respectively, of the tread in a radial direction, the clinches extend almost inward from ends of the sidewalls, respectively, in the radial direction, the beads are disposed inward of the clinches, respectively, in an axial direction, the carcass is extended on and between one of the beads and the other of the beads along inner sides of the tread and the sidewalls, the beads include: cores; and apexes disposed outward of the cores in the radial direction, the carcass includes a carcass ply, the carcass ply is turned up around the cores from an inner side toward an outer side in the axial direction, and the carcass ply includes a main portion and turned-up portions by the carcass ply being turned up, the strips extend along the main portion in the radial direction in portions radially outward of the apexes, respectively, the support layers are disposed outward of the strips, respectively, in the axial direction, and when a reference position is defined as a position on an outer surface of the tire, the position corresponding to a radially outer edge of a contact surface on which the tire and a rim contact with each other when the tire is mounted on the rim and inflated with air to a normal internal pressure, an outer end of each apex is disposed inward of the reference position in the radial direction, and each support layer extends almost outward from a portion near the reference position in the radial direction.

[14] The pneumatic tire according to [13] described above, in which a distance, in the radial direction, from the reference position to an inner end of a corresponding one of the support layers is less than or equal to 10 mm.

[15] The pneumatic tire according to [14] described above, in which a position of the inner end of each support layer is equal, in the radial direction, to the reference position, or the inner end of each support layer is disposed radially inward of the reference position.

[16] The pneumatic tire according to any one of [13] to [15] described above, in which a length of each support layer is greater than or equal to 20 mm and not greater than 40 mm.

[17] The pneumatic tire according to any one of [13] to [16] described above, in which a thickness of each support layer is greater than or equal to 1 mm and not greater than 2 mm.

[18] The pneumatic tire according to any one of [13] to [17] described above, in which a position of an outer end of each strip is equal, in the radial direction, to a position at which the tire has a maximum width, or the outer end of each strip is disposed radially inward of the position at which the tire has the maximum width.

[19] The pneumatic tire according to any one of [13] to [18] described above, in which the turned-up portions are disposed between the strips and the support layers, respectively.

EXAMPLES

Hereinafter, effects of the present invention will become apparent according to examples. However, the present invention should not be restrictively construed based on the description of examples.

Experiment 1

Example 1

A pneumatic tire of Example 1 having the basic structure shown in FIG. 1 and having the specifications indicated below in Table 1 was obtained. The size of the tire was 195/65R15. The first apexes, the second apexes, and the strips were formed by the same rubber composition being crosslinked.

Comparative Examples 1 to 3

Tires of Comparative examples 1 to 3 were each obtained in the same manner as for Example 1 except that the second apexes and the strips were not provided and the length L1, the height Hc, and the length Lp were as indicated below in Table 1. Comparative example 1 represents a conventional tire.

Comparative Example 4

A tire of Comparative example 4 was obtained in the same manner as for Example 1 except that the strips were not provided.

Comparative Example 5

A tire of Comparative example 5 was obtained in the same manner as for Example 1 except that the second apexes were not provided.

Example 2 and Comparative Examples 6 to 7

Tires of Example 2 and Comparative examples 6 to 7 were each obtained in the same manner as for Example 1 except that a rubber composition for the strip was different and the elastic modulus Es was as indicated below in Table 2.

Examples 3 to 5 and Comparative Example 8

Tires of Examples 3 to 5 and Comparative example 8 were each obtained in the same manner as for Example 1 except that the length Ls of the strip was different and the ratio (Hs/Hb) was as indicated below in Table 3.

Examples 6 to 8

Tires of Examples 6 to 8 were each obtained in the same manner as for Example 1 except that the rubber composition for the first apex, the rubber composition for the second apex, and the rubber composition for the strip were different, and the elastic modulus E1, the elastic modulus E2, and the elastic modulus Es were as indicated below in Table 4. In each of Examples 6 to 8, the first apex, the second apex, and the strip were formed by the same rubber composition being crosslinked.

Examples 9 to 12

Tires of Examples 9 to 12 were each obtained in the same manner as for Example 1 except that the length L1 of the first apex was as indicated below in Table 5.

Examples 13 to 17

Tires of Examples 13 to 17 were each obtained in the same manner as for Example 1 except that the height Hc was as indicated below in Table 6.

Examples 18 to 21

Tires of Examples 18 to 21 were each obtained in the same manner as for Example 1 except that the length Lp was as indicated below in Table 7.

[Measurement of in-Plane Torsional Stiffness and Cornering Power]

A flat belt type tire six-component force measuring device was used to measure in-plane torsional stiffness and cornering power under the following measurement conditions.
Used rim: 6.0 JJ
Internal pressure: 210 kPa
Load: 2.55 kN
Speed: 80 km/h
Camber angle: 0°
Slip angle: 1.0°

Index values are indicated below in Tables 1 to 7 with the value of each of the in-plane torsional stiffness and the cornering power of the tire of Comparative example 1 being 100. The greater the values are, the higher the in-plane torsional stiffness and the cornering power are.

[Evaluation of Lateral Stiffness]

The lateral stiffness constant of each tire was measured under the following conditions.
Used rim: 6.0 JJ
Internal pressure: 210 kPa
Load: 4.24 kN Index values are indicated below in Tables 1 to 7 with the value of the lateral stiffness constant of the tire of Comparative example 1 being 100. The greater the value is, the higher the lateral stiffness is.

[Steering Stability and Ride Comfort]

Each tire was mounted on a 6.0 JJ rim, and inflated with air to an internal pressure of 210 kPa. The tire was mounted to a passenger car having an engine displacement of 1800 cc. A driver was caused to drive the passenger car on a racing circuit and to evaluate steering stability and ride comfort. In the evaluation for steering stability, stability in a state close to N (neutral), stability at lane change, and stability at cornering on a dry course (DRY cornering), were checked. The results are indicated below as index values in Tables 1 to 7. The greater the value is, the better the evaluation is.

[Durability]

Each tire was mounted on a normal rim, and inflated with air to an internal pressure of 250 kPa. The tire was mounted to a drum-type tire testing machine, and a vertical load of 8.15 kN was applied to the tire. Running with the tire on a drum having a radius of 1.7 m at a speed of 100 km/h was performed. A running distance until damage to the tire was found was measured. The results are indicated below as index values in Tables 1 to 7 with the value of Comparative example 1 being 100. The greater the value is, the better the evaluation is.

[Mass]

The mass of one tire was measured. The results are indicated below as index values in Tables 1 to 7 with the value of Comparative example 1 being 100. The less the value is, the better the evaluation is.

[Noise]

Each tire was mounted on a rim having the size of 6.0 JJ, and inflated with air to an internal pressure of 210 kPa. The tire was mounted to a passenger car having an engine displacement of 1800 cc. The passenger car was caused to run on an asphalt road surface having a high roughness at a speed of 60 km/h. A level (dB) of noise in a 100 Hz band at a driver's seat during the running was measured by a sound collecting microphone. The measured values are indicated below as index values in Tables 1 to 7 with the value of Comparative example 1 being 100. The less the value is, the less the road noise is.

TABLE 1

| | | Evaluation results | | | | | |
|---|---|---|---|---|---|---|---|
| | | Comp. ex. 1 | Comp. ex. 2 | Comp. ex. 3 | Comp. ex. 4 | Comp. ex. 5 | Ex. 1 |
| First apex | Elastic modulus E1 [MPa] | 60 | 60 | 60 | 60 | 60 | 60 |
| | Length L1 [mm] | 35 | 5 | 5 | 5 | 5 | 5 |
| Second apex | Elastic modulus E2 [MPa] | — | — | — | 60 | — | 60 |
| | Height H2 [mm] | — | — | — | 35 | — | 35 |
| Strip | Elastic modulus Es [MPa] | — | — | — | — | 60 | 60 |
| | Length Ls [mm] | — | — | — | — | 60 | 60 |
| Chafer | Height Hc [mm] | 18 | 25 | 10 | 10 | 10 | 10 |
| Length Lp [mm] | | 70 | 10 | 10 | 10 | 10 | 10 |
| Ratio (Hs/Hb) [—] | | — | — | — | — | 1.0 | 1.0 |
| In-plane torsional stiffness [—] | | 100 | 95 | 95 | 98 | 105 | 110 |
| Cornering power [—] | | 100 | 95 | 95 | 98 | 102 | 103 |
| Lateral stiffness [—] | | 100 | 90 | 90 | 93 | 94 | 95 |
| State close to N [—] | | 6.0 | 5.0 | 4.8 | 5.5 | 6.0 | 6.3 |
| Lane change [—] | | 6.0 | 5.0 | 4.8 | 5.5 | 6.0 | 6.3 |
| DRY cornering [—] | | 6.0 | 5.0 | 4.8 | 5.5 | 6.0 | 6.3 |
| Ride comfort [—] | | 6.0 | 5.5 | 5.0 | 5.5 | 6.0 | 6.0 |
| Durability [—] | | 100 | 85 | 95 | 115 | 85 | 120 |

TABLE 1-continued

| | | Evaluation results | | | | |
|---|---|---|---|---|---|---|
| | Comp. ex. 1 | Comp. ex. 2 | Comp. ex. 3 | Comp. ex. 4 | Comp. ex. 5 | Ex. 1 |
| Mass [—] | 100 | 95 | 90 | 92 | 94 | 95 |
| Noise [—] | 100 | 99 | 99 | 97 | 97 | 95 |

TABLE 2

| | | Evaluation results | | |
|---|---|---|---|---|
| | | Comp. ex. 6 | Ex. 2 | Comp. ex. 7 |
| First apex | Elastic modulus E1 [MPa] | 60 | 60 | 60 |
| | Length L1 [mm] | 5 | 5 | 5 |
| Second apex | Elastic modulus E2 [MPa] | 60 | 60 | 60 |
| | Height H2 [mm] | 35 | 35 | 35 |
| Strip | Elastic modulus Es [MPa] | 40 | 70 | 80 |
| | Length Ls [mm] | 60 | 60 | 60 |
| Chafer | Height Hc [mm] | 10 | 10 | 10 |
| Length Lp [mm] | | 10 | 10 | 10 |
| Ratio (Hs/Hb) [—] | | 1.0 | 1.0 | 1.0 |
| In-plane torsional stiffness [—] | | 102 | 112 | 115 |
| Cornering power [—] | | 99 | 104 | 106 |
| Lateral stiffness [—] | | 94 | 95 | 96 |
| State close to N [—] | | 5.8 | 6.4 | 6.5 |
| Lane change [—] | | 5.8 | 6.4 | 6.5 |
| DRY cornering [—] | | 5.8 | 6.4 | 6.5 |
| Ride comfort [—] | | 6.0 | 5.9 | 5.5 |
| Durability [—] | | 120 | 120 | 120 |
| Mass [—] | | 95 | 95 | 95 |
| Noise [—] | | 94 | 96 | 98 |

TABLE 3

| | | Evaluation results | | | |
|---|---|---|---|---|---|
| | | Ex. 3 | Ex. 4 | Ex. 5 | Comp. ex. 8 |
| First apex | Elastic modulus E1 [MPa] | 60 | 60 | 60 | 60 |
| | Length L1 [mm] | 5 | 5 | 5 | 5 |
| Second apex | Elastic modulus E2 [MPa] | 60 | 60 | 60 | 60 |
| | Height H2 [mm] | 35 | 35 | 35 | 35 |
| Strip | Elastic modulus Es [MPa] | 60 | 60 | 60 | 60 |
| | Length Ls [mm] | 30 | 40 | 50 | 70 |
| Chafer | Height Hc [mm] | 10 | 10 | 10 | 10 |
| Length Lp [mm] | | 10 | 10 | 10 | 10 |
| Ratio (Hs/Hb) [—] | | 0.6 | 0.8 | 0.9 | 1.1 |
| In-plane torsional stiffness [—] | | 103 | 105 | 107 | 113 |
| Cornering power [—] | | 97 | 100 | 101 | 104 |
| Lateral stiffness [—] | | 94 | 95 | 95 | 95 |
| State close to N [—] | | 5.8 | 6.1 | 6.2 | 6.5 |
| Lane change [—] | | 5.8 | 6.1 | 6.2 | 6.5 |
| DRY cornering [—] | | 5.8 | 6.1 | 6.2 | 6.5 |
| Ride comfort [—] | | 6.1 | 6.0 | 6.0 | 5.6 |
| Durability [—] | | 116 | 118 | 120 | 120 |
| Mass [—] | | 93 | 93 | 94 | 98 |
| Noise [—] | | 97 | 97 | 95 | 95 |

TABLE 4

| | | Evaluation results | | |
|---|---|---|---|---|
| | | Ex. 6 | Ex. 7 | Ex. 8 |
| First apex | Elastic modulus E1 [MPa] | 55 | 70 | 75 |
| | Length L1 [mm] | 5 | 5 | 5 |
| Second apex | Elastic modulus E2 [MPa] | 55 | 70 | 75 |
| | Height H2 [mm] | 35 | 35 | 35 |
| Strip | Elastic modulus Es [MPa] | 55 | 70 | 75 |
| | Length Ls [mm] | 60 | 60 | 60 |
| Chafer | Height Hc [mm] | 10 | 10 | 10 |
| Length Lp [mm] | | 10 | 10 | 10 |
| Ratio (Hs/Hb) [—] | | 1.0 | 1.0 | 1.0 |
| In-plane torsional stiffness [—] | | 109 | 111 | 111 |
| Cornering power [—] | | 103 | 104 | 104 |
| Lateral stiffness [—] | | 95 | 96 | 96 |
| State close to N [—] | | 6.1 | 6.4 | 6.5 |
| Lane change [—] | | 6.1 | 6.4 | 6.5 |
| DRY cornering [—] | | 6.1 | 6.4 | 6.5 |
| Ride comfort [—] | | 6.0 | 5.9 | 5.7 |
| Durability [—] | | 120 | 120 | 120 |
| Mass [—] | | 95 | 95 | 95 |
| Noise [—] | | 95 | 95 | 95 |

TABLE 5

| | | Evaluation results | | | |
|---|---|---|---|---|---|
| | | Ex. 9 | Ex. 10 | Ex. 11 | Ex. 12 |
| First apex | Elastic modulus E1 [MPa] | 60 | 60 | 60 | 60 |
| | Length L1 [mm] | 4 | 10 | 13 | 15 |
| Second apex | Elastic modulus E2 [MPa] | 60 | 60 | 60 | 60 |
| | Height H2 [mm] | 35 | 35 | 35 | 35 |
| Strip | Elastic modulus Es [MPa] | 60 | 60 | 60 | 60 |
| | Length Ls [mm] | 60 | 60 | 60 | 60 |
| Chafer | Height Hc [mm] | 10 | 10 | 10 | 10 |
| Length Lp [mm] | | 10 | 10 | 10 | 10 |
| Ratio (Hs/Hb) [—] | | 1.0 | 1.0 | 1.0 | 1.0 |
| In-plane torsional stiffness [—] | | 110 | 110 | 110 | 111 |
| Cornering power [—] | | 103 | 104 | 105 | 106 |
| Lateral stiffness [—] | | 95 | 97 | 98 | 99 |
| State close to N [—] | | 6.1 | 6.5 | 6.4 | 6.4 |
| Lane change [—] | | 6.1 | 6.5 | 6.4 | 6.4 |
| DRY cornering [—] | | 6.1 | 6.5 | 6.4 | 6.4 |
| Ride comfort [—] | | 6.0 | 6.0 | 6.0 | 6.0 |
| Durability [—] | | 120 | 120 | 118 | 115 |
| Mass [—] | | 94 | 96 | 97 | 98 |
| Noise [—] | | 95 | 95 | 96 | 97 |

TABLE 6

| | | Evaluation results | | | | |
|---|---|---|---|---|---|---|
| | | Ex. 13 | Ex. 14 | Ex. 15 | Ex. 16 | Ex. 17 |
| First apex | Elastic modulus E1 [MPa] | 60 | 60 | 60 | 60 | 60 |
| | Length L1 [mm] | 5 | 5 | 5 | 5 | 5 |
| Second apex | Elastic modulus E2 [MPa] | 60 | 60 | 60 | 60 | 60 |
| | Height H2 [mm] | 35 | 35 | 35 | 35 | 35 |
| Strip | Elastic modulus Es [Ma] | 60 | 60 | 60 | 60 | 60 |
| | Length Ls [mm] | 60 | 60 | 60 | 60 | 60 |
| Chafer | Height Hc [mm] | 5.0 | 8.0 | 15 | 20 | 22 |
| Length Lp [mm] | | 10 | 10 | 10 | 10 | 10 |

TABLE 6-continued

Evaluation results

|  | Ex. 13 | Ex. 14 | Ex. 15 | Ex. 16 | Ex. 17 |
|---|---|---|---|---|---|
| Ratio (Hs/Hb) [—] | 1.0 | 1.0 | 1.0 | 1.0 | 1.0 |
| In-plane torsional stiffness [—] | 110 | 110 | 110 | 110 | 110 |
| Cornering power [—] | 103 | 103 | 103 | 103 | 103 |
| Lateral stiffness [—] | 95 | 95 | 95 | 95 | 95 |
| State close to N [—] | 6.3 | 6.3 | 6.3 | 6.3 | 6.3 |
| Lane change [—] | 6.3 | 6.3 | 6.3 | 6.3 | 6.3 |
| DRY cornering [—] | 6.3 | 6.3 | 6.3 | 6.3 | 6.3 |
| Ride comfort [—] | 6.0 | 6.0 | 6.0 | 6.0 | 6.0 |
| Durability [—] | 119 | 123 | 118 | 115 | 110 |
| Mass [—] | 94 | 94 | 96 | 97 | 97 |
| Noise [—] | 95 | 95 | 95 | 95 | 95 |

TABLE 7

Evaluation results

|  |  | Ex. 18 | Ex. 19 | Ex. 20 | Ex. 21 |
|---|---|---|---|---|---|
| First apex | Elastic modulus E1 [MPa] | 60 | 60 | 60 | 60 |
|  | Length L1 [mm] | 5 | 5 | 5 | 5 |
| Second apex | Elastic modulus E2 [MPa] | 60 | 60 | 60 | 60 |
|  | Height H2 [mm] | 35 | 35 | 35 | 35 |
| Strip | Elastic modulus Es [MPa] | 60 | 60 | 60 | 60 |
|  | Length Ls [mm] | 60 | 60 | 60 | 60 |
| Chafer | Height Hc [mm] | 10 | 10 | 10 | 10 |
| Length Lp [mm] |  | 8 | 15 | 20 | 25 |
| Ratio (Hs/Hb) [—] |  | 1.0 | 1.0 | 1.0 | 1.0 |
| In-plane torsional stiffness [—] |  | 110 | 113 | 115 | 117 |
| Cornering power [—] |  | 103 | 103 | 104 | 104 |
| Lateral stiffness [—] |  | 95 | 96 | 97 | 98 |
| State close to N [—] |  | 6.3 | 6.4 | 6.4 | 6.5 |
| Lane change [—] |  | 6.3 | 6.4 | 6.4 | 6.5 |
| DRY cornering [—] |  | 6.3 | 6.4 | 6.4 | 6.5 |
| Ride comfort [—] |  | 6.0 | 6.0 | 6.0 | 6.0 |
| Durability [—] |  | 118 | 120 | 115 | 110 |
| Mass [—] |  | 94 | 98 | 100 | 105 |
| Noise [—] |  | 95 | 95 | 95 | 95 |

As indicated in Tables 1 to 7, evaluation is higher in the tires of examples than in the tires of comparative examples. The evaluation results clearly indicate that the present invention is superior.

Experiment 2

Example 1a

A tire shown in FIGS. 3 to 4 was produced. The size of the tire was 195/65R15. The hardness of the apex was 85. The hardness of the reinforcing layer was 85. In Example 1a, the apex and the reinforcing layer were formed by the same rubber composition. The height Haa, in the radial direction, from the bead base line to the reference position Paa was 22 mm.

Comparative Example 1a

Comparative example 1a represents a conventional tire. In Comparative example 1a, a conventional apex (length=35 mm) was used, and the reinforcing layers were not provided.

Comparative Example 2a

A tire of Comparative example 2a was obtained in the same manner as for Example 1a except that the reinforcing layers were not provided.

Examples 2a to 3a

Tires of Examples 2a to 3a were each obtained in the same manner as for Example 1a except that the thickness tra of the reinforcing layer was as indicated below in Table 8.

Examples 4a to 10a

Tires of Examples 4a to 10a were each obtained in the same manner as for Example 1a except that the length Lra of the reinforcing layer was adjusted and the ratio (Hra/Ha) was as indicated below in Table 9. In Example 9a, the position of the outer end of the reinforcing layer was equal to the maximum width position Pba in the radial direction. In Example 10a, the outer end of the reinforcing layer was disposed radially outward of the maximum width position Pba.

Examples 11a to 15a and Comparative Example 3a

Tires of Examples 11a to 15a and Comparative example 3a were each obtained in the same manner as for Example 1a except that the length Lra of the reinforcing layer was adjusted and the distance Da was as indicated below in Table 10.

[Measurement of In-Plane Torsional Stiffness and Cornering Power]

A flat belt type tire six-component force measuring device was used to measure in-plane torsional stiffness and cornering power under the following measurement conditions.

Used rim: 6.0 JJ
Internal pressure: 210 kPa
Load: 2.55 kN
Speed: 80 km/h
Camber angle: 0°
Slip angle: 1.0°

Index values are indicated below in Tables 8 to 10 with the value of each of the in-plane torsional stiffness and the cornering power of the tire of Comparative example 1a being 100. The greater the values are, the higher the in-plane torsional stiffness and the cornering power are.

[Evaluation of Lateral Stiffness]

The lateral stiffness constant of each tire was measured under the following conditions.

Used rim: 6.0 JJ
Internal pressure: 210 kPa
Load: 4.24 kN

Index values are indicated below in Tables 8 to 10 with the value of the lateral stiffness constant of the tire of Comparative example 1a being 100. The greater the value is, the higher the lateral stiffness is.

[Rolling Resistance]

A rolling resistance testing machine was used to measure rolling resistance under the following measurement conditions.

Used rim: 6.0 JJ (made of aluminium alloy)
Internal pressure: 210 kPa
Load: 4.82 kN
Speed: 80 km/h The results are indicated below as index values in Tables 8 to 10 with the value of Comparative example 1a being 100. The less the value is, the better the evaluation is.

[Mass]

The mass of one tire was measured. The results are indicated below as index values in Tables 8 to 10 with the value of Comparative example 1a being 100. The less the value is, the better the evaluation is.

[Steering Stability and Ride Comfort]

Each tire was mounted on a 6.0 JJ rim, and inflated with air to an internal pressure of 210 kPa. The tire was mounted to a passenger car having an engine displacement of 1800 cc. A driver was caused to drive the passenger car on a racing circuit and to evaluate steering stability and ride comfort. In the evaluation for steering stability, stability in a state close to N (neutral), stability at lane change, and stability at cornering on a dry course, were checked. The results are indicated below as index values in Tables 8 to 10. The greater the value is, the better the evaluation is.

TABLE 8

| | Evaluation results | | | | |
|---|---|---|---|---|---|
| | Comp. ex. 1a | Comp. ex. 2a | Ex. 2a | Ex. 1a | Ex. 3a |
| Length Laa [mm] | 35 | 5 | 5 | 5 | 5 |
| Thickness tra [mm] | — | — | 1.0 | 2.0 | 3.0 |

TABLE 8-continued

| | Evaluation results | | | | |
|---|---|---|---|---|---|
| | Comp. ex. 1a | Comp. ex. 2a | Ex. 2a | Ex. 1a | Ex. 3a |
| Distance Da [mm] | — | — | 0 | 0 | 0 |
| Ratio (Hra/Ha) | — | — | 0.45 | 0.45 | 0.45 |
| Reinforcing layer length Lra [mm] | — | — | 60 | 60 | 60 |
| In-plane torsional stiffness [—] | 100 | 95 | 105 | 106 | 107 |
| Cornering power [—] | 100 | 93 | 104 | 105 | 105 |
| Lateral stiffness [—] | 100 | 85 | 88 | 89 | 90 |
| Rolling resistance [—] | 100 | 100 | 100 | 100 | 100 |
| Mass [—] | 100 | 92 | 95 | 96 | 97 |
| State close to neutral [—] | 6.0 | 5.6 | 6.1 | 6.3 | 6.4 |
| Lane change [—] | 6.0 | 5.6 | 6.2 | 6.3 | 6.3 |
| Cornering [—] | 6.0 | 5.8 | 6.4 | 6.5 | 6.5 |
| Ride comfort [—] | 6.0 | 6.2 | 6.0 | 6.0 | 6.0 |

TABLE 9

| | Evaluation results | | | | | | |
|---|---|---|---|---|---|---|---|
| | Ex. 4a | Ex. 5a | Ex. 6a | Ex. 7a | Ex. 8a | Ex. 9a | Ex. 10a |
| Length Laa [mm] | 5 | 5 | 5 | 5 | 5 | 5 | 5 |
| Thickness tra [mm] | 2.0 | 2.0 | 2.0 | 2.0 | 2.0 | 2.0 | 2.0 |
| Distance Da [mm] | 0 | 0 | 0 | 0 | 0 | 0 | 0 |
| Ratio (Hra/Ha) | 0.27 | 0.33 | 0.40 | 0.42 | 0.48 | 0.52 | 0.59 |
| Reinforcing layer length Lra [mm] | 30 | 40 | 50 | 55 | 65 | 70 | 80 |
| In-plane torsional stiffness [—] | 103 | 103 | 104 | 106 | 108 | 109 | 109 |
| Cornering power [—] | 102 | 102 | 103 | 104 | 105 | 104 | 103 |
| Lateral stiffness [—] | 87 | 88 | 89 | 89 | 89 | 89 | 89 |
| Rolling resistance [—] | 100 | 100 | 100 | 100 | 100 | 100 | 102 |
| Mass [—] | 95 | 95 | 96 | 96 | 97 | 97 | 99 |
| State close to neutral [—] | 5.8 | 5.9 | 6.0 | 6.2 | 6.4 | 6.4 | 6.3 |
| Lane change [—] | 5.8 | 5.9 | 6.0 | 6.2 | 6.4 | 6.4 | 6.3 |
| Cornering [—] | 5.7 | 5.8 | 6.1 | 6.4 | 6.5 | 6.6 | 6.5 |
| Ride comfort [—] | 6.2 | 6.1 | 6.0 | 6.0 | 6.0 | 6.0 | 5.9 |

TABLE 10

| | Evaluation results | | | | | |
|---|---|---|---|---|---|---|
| | Ex. 11a | Ex. 12a | Ex. 13a | Ex. 14a | Ex. 15a | Comp. ex. 3a |
| Length Laa [mm] | 5 | 5 | 5 | 5 | 5 | 5 |
| Thickness tra [mm] | 2.0 | 2.0 | 2.0 | 2.0 | 2.0 | 2.0 |
| Distance Da [mm] | −10 | −5 | −3 | 3 | 5 | 10 |
| Ratio (Hra/Ha) | 0.45 | 0.45 | 0.45 | 0.45 | 0.45 | 0.45 |
| Reinforcing layer length Lra [mm] | 70 | 65 | 63 | 57 | 55 | 50 |
| In-plane torsional stiffness [—] | 105 | 105 | 106 | 105 | 104 | 103 |
| Cornering power [—] | 104 | 104 | 105 | 104 | 103 | 102 |
| Lateral stiffness [—] | 89 | 89 | 89 | 89 | 88 | 87 |
| Rolling resistance [—] | 100 | 100 | 100 | 100 | 100 | 100 |
| Mass [—] | 99 | 99 | 96 | 95 | 95 | 94 |
| State close to neutral [—] | 6.3 | 6.3 | 6.3 | 6.2 | 6.1 | 5.8 |
| Lane change [—] | 6.3 | 6.3 | 6.3 | 6.2 | 6.1 | 5.7 |
| Cornering [—] | 6.5 | 6.5 | 6.5 | 6.3 | 6.2 | 5.7 |
| ride comfort [—] | 5.8 | 5.9 | 6.0 | 6.0 | 5.9 | 5.8 |

As indicated in Tables 8 to 10, evaluation is higher in the tires of examples than in the tires of comparative examples. The evaluation results clearly indicate that the present invention is superior.

Experiment 3

Example 1b

A tire shown in FIGS. 5 to 6 was produced. The size of the tire was 195/65R15. "HTU" in the cells for "Structure of carcass" in Table 11 indicates that the carcass has a "highly turned-up" structure. "Y" in the cells for "Sandwich structure" indicates that the turned-up portions are disposed between the strips and the support layers. In Example 1b, the apexes, the strips, and the support layers were formed by the same rubber composition. The length Lsb of the strip was 50 mm. The thickness tsb of the strip was 1.0 mm. The height Hbb, in the radial direction, from the bead base line to the reference position Pab was 22 mm.

Comparative Example 1b

Comparative example 1b represents a conventional tire. In Comparative example 1b, a conventional apex (length=35 mm) was used, and the strips and the support layers were not provided.

Comparative Example 2b

A tire of Comparative example 2b was obtained in the same manner as for Example 1b except that the support layers were not provided.

Examples 2b to 4b

Tires of Examples 2b to 4b were each obtained in the same manner as for Example 1b except that the thickness trb of the support layer was as indicated below in Table 11.

Examples 5b to 11b and 13b

Tires of Examples 5b to 11b and 13b were each obtained in the same manner as for Example 1b except that the length Lrb, the distance Dab, and the distance Dbb were as indicated below in Tables 12 and 13.

Example 12b

A tire of Example 12b was obtained in the same manner as for Example 1b except that the distance Dab and the distance Dbb were as indicated below in Table 13.

Example 14b

A tire of Example 14b was obtained in the same manner as for Example 1b except that the structure of the carcass was a low turn-up structure. "LTU" in the cells for "Structure of carcass" in Table 14 indicates that the carcass has a "low turn-up" structure.

Examples 15b to 17b

Tires of Examples 15b to 17b were each obtained in the same manner as for Example 1b except that the structure of the carcass was a low turn-up structure, and the length Lrb, the distance Dab, and the distance Dbb were as indicated below in Table 14. In Example 17b, the turned-up portions were not disposed between the strips and the support layers. This state is indicated as "N" in the cell for "Sandwich structure" in Table 14.

Examples 18b to 21b

Tires of Examples 18b to 21b were each obtained in the same manner as for Example 1b except that the rubber composition of the support layers was different and the hardness thereof was as indicated below in Table 15. The apexes and the strips were similar to those in Example 1b.

Examples 22b to 24b

Tires of Examples 22b to 24b were each obtained in the same manner as for Example 1b except that the length Lab of the apex was as indicated below in Table 16.

[Rolling Resistance]

A rolling resistance testing machine was used to measure rolling resistance under the following measurement conditions.
Used rim: 6.0 JJ (made of aluminium alloy)
Internal pressure: 210 kPa
Load: 4.82 kN
Speed: 80 km/h The results are indicated below as index values in Tables 11 to 16 with the value of Comparative example 1b being 100. The less the value is, the better the evaluation is.

[Mass]

The mass of one tire was measured. The results are indicated below as index values in Tables 11 to 16 with the value of Comparative example 1b being 100. The less the value is, the better the evaluation is.

[Steering Stability and Ride Comfort]

Each tire was mounted on a 6.0 JJ rim, and inflated with air to an internal pressure of 210 kPa. The tire was mounted to a passenger car having an engine displacement of 1800 cc. A driver was caused to drive the passenger car on a racing circuit and to evaluate steering stability and ride comfort. In the evaluation for steering stability, stability in a state close to N (neutral), stability at lane change, and stability at cornering on a dry course, were checked. The results are indicated below as index values in Tables 11 to 16. The greater the value is, the better the evaluation is.

TABLE 11

| | | Evaluation results | | | | |
|---|---|---|---|---|---|---|
| | Comp. ex. 1b | Comp. ex. 2b | Ex. 2b | Ex. 3b | Ex. 1b | Ex. 4b |
| Structure of carcass | HTU | HTU | HTU | HTU | HTU | HTU |
| Apex length Lab [mm] | 35 | 5.0 | 5.0 | 5.0 | 5.0 | 5.0 |
| Support layer length Lrb [mm] | — | — | 40 | 40 | 40 | 40 |
| Support layer thickness trb [mm] | — | — | 0.5 | 1.0 | 2.0 | 3.0 |
| Support layer hardness | — | — | 85 | 85 | 85 | 85 |
| Distance Dab [mm] | — | — | 0 | 0 | 0 | 0 |
| Distance Dbb [mm] | — | — | 40 | 40 | 40 | 40 |
| Sandwich structure | — | — | Y | Y | Y | Y |
| Rolling resistance | 100 | 100 | 100 | 100 | 100 | 101 |
| Mass | 100 | 90 | 95 | 97 | 100 | 101 |
| Steering stability State close to N | 6.0 | 5.6 | 6.2 | 6.6 | 6.9 | 7.0 |
| Steering stability Lane change | 6.0 | 5.6 | 6.2 | 6.6 | 6.9 | 7.0 |
| Steering stability Cornering | 6.0 | 5.8 | 6.3 | 6.8 | 7.1 | 7.2 |
| Ride comfort | 6.0 | 6.2 | 6.1 | 6.0 | 6.0 | 5.8 |

TABLE 12

Evaluation results

|  |  | Ex. 5b | Ex. 6b | Ex. 7b | Ex. 8b | Ex. 9b |
|---|---|---|---|---|---|---|
| Structure of carcass | | HTU | HTU | HTU | HTU | HTU |
| Apex length Lab [mm] | | 5.0 | 5.0 | 5.0 | 5.0 | 5.0 |
| Support layer length Lrb [mm] | | 30 | 30 | 30 | 30 | 30 |
| Support layer thickness trb [mm] | | 2.0 | 2.0 | 2.0 | 2.0 | 2.0 |
| Support layer hardness | | 85 | 85 | 85 | 85 | 85 |
| Distance Dab [mm] | | −20 | −10 | 0 | 10 | 20 |
| Distance Dbb [mm] | | 10 | 20 | 30 | 40 | 50 |
| Sandwich structure | | Y | Y | Y | Y | Y |
| Rolling resistance | | 100 | 100 | 100 | 100 | 100 |
| Mass | | 99 | 99 | 99 | 99 | 99 |
| Steering stability | State close to N | 6.3 | 6.5 | 6.7 | 6.4 | 6.2 |
| | Lane change | 6.3 | 6.5 | 6.7 | 6.4 | 6.2 |
| | Cornering | 6.5 | 6.7 | 6.9 | 6.7 | 6.4 |
| Ride comfort | | 5.9 | 6.0 | 6.0 | 6.0 | 5.9 |

TABLE 13

Evaluation results

|  |  | Example 10b | Example 11b | Example 12b | Example 13b |
|---|---|---|---|---|---|
| Structure of carcass | | HTU | HTU | HTU | HTU |
| Apex length Lab [mm] | | 5.0 | 5.0 | 5.0 | 5.0 |
| Support layer length Lrb [mm] | | 10 | 20 | 40 | 50 |
| Support layer thickness trb [mm] | | 2.0 | 2.0 | 2.0 | 2.0 |
| Support layer hardness | | 85 | 85 | 85 | 85 |
| Distance Dab [mm] | | 0 | 0 | −10 | −10 |
| Distance Dbb [mm] | | 10 | 20 | 30 | 40 |
| Sandwich structure | | Y | Y | Y | Y |
| Rolling resistance | | 100 | 100 | 100 | 100 |
| Mass | | 97 | 98 | 100 | 101 |
| Steering stability | State close to N | 6.3 | 6.6 | 6.7 | 6.9 |
| | Lane change | 6.3 | 6.6 | 6.7 | 6.9 |
| | Cornering | 6.5 | 6.8 | 6.9 | 7.1 |
| Ride comfort | | 5.9 | 6.0 | 6.0 | 6.0 |

TABLE 14

Evaluation results

|  |  | Ex. 14b | Ex. 15b | Ex. 16b | Ex. 17b |
|---|---|---|---|---|---|
| Structure of carcass | | LTU | LTU | LTU | LTU |
| Apex length Lab [mm] | | 5.0 | 5.0 | 5.0 | 5.0 |
| Support layer length Lrb [mm] | | 40 | 30 | 30 | 30 |
| Support layer thickness trb [mm] | | 2.0 | 2.0 | 2.0 | 2.0 |
| Support layer hardness | | 85 | 85 | 85 | 85 |
| Distance Dab [mm] | | 0 | −10 | 0 | 10 |
| Distance Dbb [mm] | | 40 | 20 | 30 | 40 |
| Sandwich structure | | Y | Y | Y | N |
| Rolling resistance | | 99 | 99 | 99 | 99 |
| Mass | | 97 | 96 | 96 | 96 |
| Steering stability | State close to N | 6.6 | 6.2 | 6.4 | 6.1 |
| | Lane change | 6.6 | 6.2 | 6.4 | 6.1 |
| | Cornering | 6.8 | 6.4 | 6.6 | 6.3 |
| Ride comfort | | 6.0 | 6.0 | 6.0 | 6.0 |

TABLE 15

Evaluation results

|  |  | Ex. 18b | Ex. 19b | Ex. 20b | Ex. 21b |
|---|---|---|---|---|---|
| Structure of carcass | | HTU | HTU | HTU | HTU |
| Apex length Lab [mm] | | 5.0 | 5.0 | 5.0 | 5.0 |
| Support layer length Lrb [mm] | | 40 | 40 | 40 | 40 |
| Support layer thickness trb [mm] | | 2.0 | 2.0 | 2.0 | 2.0 |
| Support layer hardness | | 75 | 80 | 95 | 98 |
| Distance Dab [mm] | | 0 | 0 | 0 | 0 |
| Distance Dbb [mm] | | 40 | 40 | 40 | 40 |
| Sandwich structure | | Y | Y | Y | Y |
| Rolling resistance | | 100 | 100 | 100 | 100 |
| Mass | | 100 | 100 | 100 | 100 |
| Steering stability | State close to N | 6.1 | 6.5 | 7.0 | 7.1 |
| | Lane change | 6.1 | 6.5 | 7.0 | 7.1 |
| | Cornering | 6.3 | 6.7 | 7.1 | 7.2 |
| Ride comfort | | 6.3 | 6.1 | 5.9 | 5.5 |

TABLE 16

Evaluation results

|  |  | Ex. 22b | Ex. 23b | Ex. 24b |
|---|---|---|---|---|
| Structure of carcass | | HTU | HTU | HTU |
| Apex length Lab [mm] | | 10 | 15 | 20 |
| Support layer length Lrb [mm] | | 40 | 40 | 40 |
| Support layer thickness trb [mm] | | 2.0 | 2.0 | 2.0 |
| Support layer hardness | | 85 | 85 | 85 |
| Distance Dab [mm] | | 0 | 0 | 0 |
| Distance Dbb [mm] | | 40 | 40 | 40 |
| Sandwich structure | | Y | Y | Y |
| Rolling resistance | | 100 | 100 | 101 |
| Mass | | 100 | 100 | 101 |
| Steering stability | State close to N | 7.0 | 7.1 | 7.1 |
| | Lane change | 7.0 | 7.1 | 7.1 |
| | Cornering | 7.1 | 7.1 | 7.1 |
| Ride comfort | | 6.0 | 5.9 | 5.6 |

As indicated in Tables 11 to 16, evaluation is higher in the tires of examples than in the tires of comparative examples. The evaluation results clearly indicate that the present invention is superior.

INDUSTRIAL APPLICABILITY

The pneumatic tire described above is also applicable to various vehicles.

DESCRIPTION OF THE REFERENCE CHARACTERS 2, 102, 202 . . . tire
4, 104, 204 . . . tread
8, 108, 208 . . . sidewall
10, 110, 210 . . . clinch
12, 112, 212 . . . bead
14, 114, 214 . . . carcass
24, 224 . . . strip
26, 126, 228 . . . tread surface
34, 134, 236 . . . core
36 . . . first apex
38 . . . second apex
40 . . . outer end of second apex 38
42 . . . outer end of first apex 36
44, 138, 240 . . . carcass ply
46, 140, 242 . . . main portion
48, 142, 244 . . . turned-up portion 50 . . . end of turned-up portion 48
52 . . . outer end of clinch 10
54 . . . inner end of second apex 38
60 . . . one end of chafer 22
64 . . . outer end of strip 24
124 . . . reinforcing layer
136, 238 . . . apex
144 . . . end of turned-up portion 142
150 . . . bottom surface of apex 136
152 . . . outer end of apex 136
154 . . . inner end of reinforcing layer 124
156 . . . outer end of reinforcing layer 124
226 . . . support layer
246 . . . end of turned-up portion 244
252 . . . outer end of apex 238
254 . . . outer end of strip 224
256 . . . inner end of strip 224
258 . . . outer end of support layer 226
260 . . . inner end of support layer 226

The invention claimed is:

1. A pneumatic tire comprising:
a tread having an outer surface that forms a tread surface;
a pair of sidewalls that extend inward from ends, respectively, of the tread in a radial direction;
a pair of clinches that extend inward from ends of the sidewalls, respectively, in the radial direction;
a pair of beads disposed inward of the clinches, respectively, in an axial direction;
a carcass extended on and between one of the beads and the other of the beads along inner sides of the tread and the sidewalls; and
a pair of strips that extend outward from the beads, respectively, along the carcass in the radial direction, wherein
the beads include: cores; first apexes that extend outward from the cores in the radial direction; and second apexes disposed outward of the first apexes in the axial direction,
the carcass includes a carcass ply,
the carcass ply is turned up around the cores from an inner side toward an outer side in the axial direction, and the carcass ply includes a main portion and turned-up portions by the carcass ply being turned up,
the turned-up portions are disposed between the first apexes and the second apexes, and the turned-up portions contact with the main portion in portions radially outward of outer ends of the first apexes,
outer ends of the second apexes are disposed outward of ends of the turned-up portions in the radial direction,
a position of an outer end of each strip is equal, in the radial direction, to a position at which the tire has a maximum width, or the outer end of each strip is disposed radially inward of the position at which the tire has the maximum width, and
a complex elastic modulus of each strip is higher than or equal to 60 MPa and not higher than 70 MPa.

2. The pneumatic tire according to claim 1, wherein a length of each first apex is greater than or equal to 5 mm and not greater than 15 mm.

3. The pneumatic tire according to claim 2, wherein a length from the outer end of each first apex to the end of a corresponding one of the turned-up portions is greater than or equal to 10 mm.

4. The pneumatic tire according to claim 1, wherein a length from the outer end of each first apex to the end of a corresponding one of the turned-up portions is greater than or equal to 10 mm.

5. The pneumatic tire according to claim 1, comprising
a pair of chafers that are turned up around the beads, respectively, from the inner side toward the outer side in the axial direction, wherein
one end of each chafer is disposed between a corresponding one of the turned-up portions and a corresponding one of the clinches in the axial direction,
a height from a bead base line to the one end of each chafer is greater than or equal to 5 mm and not greater than 22 mm, and
the chafers contact with a rim when the tire is mounted on the rim.

6. The pneumatic tire according to claim 1, wherein the strips extend outward from the outer ends of the second apexes along the main portion in the radial direction.

* * * * *